(12) United States Patent
Niki

(10) Patent No.: US 10,569,835 B2
(45) Date of Patent: Feb. 25, 2020

(54) INTERNAL TRANSMISSION

(71) Applicant: Shimano Inc., Sakai, Osaka (JP)

(72) Inventor: Kazutaka Niki, Osaka (JP)

(73) Assignee: Shimano Inc., Osaka (JP)

( * ) Notice: Subject to any disclaimer, the term of this patent is extended or adjusted under 35 U.S.C. 154(b) by 541 days.

(21) Appl. No.: 15/132,693

(22) Filed: Apr. 19, 2016

(65) Prior Publication Data

US 2016/0347412 A1 Dec. 1, 2016

(30) Foreign Application Priority Data

May 29, 2015 (JP) ................. 2015-110714

(51) Int. Cl.
*B62M 11/06* (2006.01)
*F16H 3/083* (2006.01)
*F16H 37/04* (2006.01)

(52) U.S. Cl.
CPC ............. *B62M 11/06* (2013.01); *F16H 3/083* (2013.01); *F16H 37/043* (2013.01); *F16H 2200/0052* (2013.01)

(58) Field of Classification Search
CPC ....... B62M 11/00; B62M 11/04; B62M 11/06; F16H 3/00; F16H 3/02; F16H 3/04; F16H 3/08; F16H 3/083; F16H 3/087; F16H 3/093; F16H 3/097; F16H 3/10; F16H 3/12; F16H 3/126; F16H 37/00; F16H 37/02; F16H 37/04; F16H 37/042; F16H 37/043; F16H 2003/0826; F16H 2037/045; F16H 2200/003; F16H 2200/0052

USPC ........................ 280/238, 260, 261
See application file for complete search history.

(56) References Cited

U.S. PATENT DOCUMENTS 3,920,263 A * 11/1975 Bundschuh ............ B62M 11/06
280/236
5,667,233 A * 9/1997 Metzinger .............. B62M 11/06
280/238
5,855,530 A 1/1999 Huang et al.
(Continued)

FOREIGN PATENT DOCUMENTS

CN 102225699 A 10/2011
CN 202213480 U 5/2012
(Continued)

*Primary Examiner* — William Kelleher
*Assistant Examiner* — Joseph Brown
(74) *Attorney, Agent, or Firm* — Global IP Counselors, LLP

(57) ABSTRACT

An internal transmission is basically arranged with a hub shaft which is attachable to a bicycle frame, a first shaft which is separate from the hub shaft and which is non-rotatable around the hub shaft, and a second shaft which is separate from the hub shaft and from the first shaft and which is non-rotatable around the hub shaft. The internal transmission has a plurality of first rotating bodies which are coaxially rotatable around the first shaft, and a plurality of second rotating bodies which are coupled to each of the first rotating bodies, and which are coaxially rotatable around the axis of the second shaft. The internal transmission has a clutch mechanism which controls at least one of the rotation state of the first rotating body and the rotation state of the second rotating body, and a hub shell which is rotated around the hub shaft.

18 Claims, 12 Drawing Sheets

(56) References Cited

U.S. PATENT DOCUMENTS

| | | | | |
|---|---|---|---|---|
| 5,924,950 | A * | 7/1999 | Pusic | ................ B62M 11/06 74/362 |
| 8,272,655 | B2 * | 9/2012 | Kim | ................ B62M 11/10 280/260 |
| 8,608,610 | B2 | 12/2013 | Schmitz et al. | |
| 2014/0224049 | A1 * | 8/2014 | Schmitz | ............ B62M 11/06 74/337.5 |

FOREIGN PATENT DOCUMENTS

| | | | | |
|---|---|---|---|---|
| DE | 202014101968 U1 * | 7/2015 | ............ | B62M 11/06 |
| FR | 2913661 A1 * | 9/2008 | ............ | B62M 11/06 |
| TW | 200906683 A | 2/2009 | | |
| WO | WO-2012156613 A1 * | 11/2012 | ............ | B62M 11/06 |

* cited by examiner

| Stage | Input Side | | Output Side | | |
|---|---|---|---|---|---|
| | First Engagement Part | Second Engagement Part | Third Engagement Part | Fourth Engagement Part | Fifth Engagement Part |
| 1 | up | down | up | down | down |
| 2 | up | down | up (or down) | up | down |
| 3 | up | down | up (or down) | down | up |
| 4 | up (or down) | up | up | down | down |
| 5 | up (or down) | up | up (or down) | up | down |
| 6 | up (or down) | up | up (or down) | down | up |

INTERNAL TRANSMISSION

CROSS-REFERENCE TO RELATED APPLICATIONS

This application claims priority to Japanese Patent Application No. 2015-110714, filed on May 29, 2015. The entire disclosure of Japanese Patent Application No. 2015-110714 is hereby incorporated herein by reference.

BACKGROUND

Field of the Invention

The present invention generally relates to an internal transmission mounted on a bicycle.

Background Information

An internal transmission comprising a hub shaft, a plurality of transmission gears for outputting attached to the hub shaft, a rotating shaft which is not coaxial with the hub shaft, and a plurality of transmission gears for inputting attached to the rotating shaft is known. U.S. Pat. No. 5,667,233 discloses one example of such an internal transmission.

SUMMARY

Generally, the present disclosure is directed to various features of an internal transmission.

With the internal transmission described above, providing a plurality of transmission gears coaxially with the hub shaft is necessary. Therefore, the degree of freedom in the design thereof is low.

An object of the present invention is to provide an internal transmission with a high degree of freedom in the design.

In view of the state of the known technology and in accordance with a first aspect of the present disclosure, an internal transmission according to the present invention comprises a hub shaft, a first shaft, a second shaft, a plurality of first rotating bodies, a plurality of second rotating bodies, a clutch mechanism and a hub shell. The hub shaft is configured to be attached to a frame of a bicycle. The first shaft is separated from an axis of the hub shaft and non-rotatably arranged around an axis of the hub shaft. The second shaft is separated from the axis of the hub shaft and from an axis of the first shaft. The second shaft is non-rotatably arranged around the axis of the hub shaft. The first rotating bodies are coaxially arranged with the first shaft and rotatably arranged around the axis of the first shaft. The second rotating bodies are coaxially arranged with the second shaft. The second rotating bodies are coupled to each of the first rotating bodies. The second rotating bodies are rotatably arranged around the axis of the second shaft. The clutch mechanism controls at least one of a rotation state of the first rotating bodies around the axis of the first shaft and the rotation state of the second rotating bodies around the second shaft. The hub shell is rotatably arranged around the axis of the hub shaft and houses the first shaft, the second shaft, the first rotating bodies, the second rotating bodies and the clutch mechanism.

In accordance with a second aspect of the present invention, the internal transmission is configured so that the first rotating body comprises a gear, and the second rotating body comprises a gear which meshes with the first rotating body.

In accordance with a third aspect of the present invention, the internal transmission is configured so that the plurality of first rotating bodies comprise an input gear to which a rotation is inputted, and an output gear which outputs the rotation to the hub shell.

In accordance with a fourth aspect of the present invention, the internal transmission is configured so that at least one of the input gear and the output gear comprises a plurality of gears having different diameters.

In accordance with a fifth aspect of the present invention, the internal transmission is configured so that the plurality of second rotating bodies comprise a plurality of input side gears which mesh with each of the plurality of gears of the input gear.

In accordance with a sixth aspect of the present invention, the internal transmission is configured no that the plurality of second rotating bodies comprise a plurality of output side gears which mesh with each of the plurality of gears of the output gear.

In accordance with a seventh aspect of the present invention, the internal transmission is configured so that the second shaft is formed by a hollow shaft which rotatably supports the plurality of second rotating bodies, the clutch mechanism comprises a control shaft and a plurality of engagement parts, the control shaft is disposed in the second shaft and is rotatable with respect to the second shaft, and the plurality of engagement parts are operated by a rotation of the control shaft and selectively transmits a rotation of one of the plurality of input side gears to the second shaft.

In accordance with an eighth aspect of the present invention, the internal transmission is configured so that the second shaft is formed by a hollow shaft which rotatably supports the plurality of second rotating bodies, the clutch mechanism comprises a control shaft and a plurality of engagement parts, the control shaft is disposed in the second shaft and is rotatable with respect to the second shaft, and the plurality of engagement parts are operated by a rotation of the control shaft and selectively transmits the rotation of the second shaft to one of the plurality of output side gears.

In accordance with a ninth aspect of the present invention, the internal transmission is configured so that the second shaft is formed by a hollow shaft which rotatably supports the plurality of second rotating bodies, the clutch mechanism comprises a control shaft and a plurality of engagement parts, the control shaft is disposed in the second shaft and is rotatable with respect to the second shaft, and the plurality of engagement parts are operated by a rotation of the control shaft and selectively transmits a rotation of one of the plurality of input side gears to the second shaft and selectively transmits the rotation of the second shaft to one of the plurality of output side gears.

In accordance with a tenth aspect of the present invention, the internal transmission is configured so that an opening is formed on an outer perimeter part of the second shaft, at least one engagement part of the plurality of engagement parts is disposed in the opening, the control shaft comprises a control portion for controlling the engagement part which is disposed in the opening, and switches between a first state in which the engagement part protrudes from the opening and a second state in which the engagement part retracts into the opening, by rotating with respect to the second shaft.

In accordance with an eleventh aspect of the present invention, the internal transmission is configured so that the clutch mechanism further comprises an elastic member for biasing the engagement part to protrude from the opening.

In accordance with a twelfth aspect of the present invention, the internal transmission is configured so that the clutch mechanism comprises a speed reducing mechanism for increasing a speed of the rotation of the second shaft and providing the same to the control shaft, and a speed reducing mechanism for reducing the speed of the rotation of the second shaft and providing the same to the control shaft.

In accordance with a thirteenth aspect of the present invention, the internal transmission is configured so that the speed increasing mechanism comprises a first synchronizing gear configured to be integrally rotated with the second shaft, a second synchronizing gear configured to be integrally rotatable with the control shaft, a first auxiliary gear configured to mesh with one of the first synchronizing gear and the second synchronizing gear, a second auxiliary gear configured to mesh with the other of the first synchronizing gear and the second synchronizing gear and configured to be integrally rotated with the first auxiliary gear, and a first switching unit configured to switch between a state in which the first auxiliary gear meshes with one of the first synchronizing gear and the second synchronizing gear, and a state in which the first auxiliary gear does not mesh with one of the first synchronizing gear and the second synchronizing gear.

In accordance with a fourteenth aspect of the present invention, the internal transmission is configured so that the speed decreasing mechanism comprises the first synchronizing gear, a third synchronizing gear configured to be integrally rotated with the control shaft and which has a fewer number of teeth than the second synchronizing gear, a third auxiliary gear configured to mesh with one of the first synchronizing gear and the third synchronizing gear, a fourth auxiliary gear configured to mesh with the other of the first synchronizing gear and the third synchronizing gear and configured to be integrally rotated with the second auxiliary gear, and a second switching unit configured to be switch between a state in which the third auxiliary gear meshes with one of the first synchronizing gear and the third synchronizing gear, and astute in which the third auxiliary gear does not mesh with one of the first synchronizing gear and the third synchronizing gear.

In accordance with a fifteenth aspect of the present invention, the internal transmission further comprises a support member configured to be fixed to the hub shaft and supports the first shaft and the second shaft.

In accordance with a sixteenth aspect of the present invention, the internal transmission is configured so that the hub shaft comprises a first hub shaft and a second hub shaft which is separated from the first hub shaft, the first hub shaft protrudes to one of the axial directions of the huh shell, and the second hub shaft protrudes to the other of the axial direction of the hub shell.

In accordance with a seventeenth aspect of the present invention, the internal transmission is configured so that a distance between the hub shaft and the first shaft in a radial direction is substantially equal to a distance between the hub shaft and the second shaft in the radial direction.

In accordance with an eighteenth aspect of the present invention, the internal transmission is configured so that the axis of the first shaft and the axis of the second shaft are disposed symmetrically with respect to the axis of the hub shaft.

In accordance with a nineteenth aspect of the present invention, the internal transmission further comprises a drive unit comprising an inner gear configured to mesh with the input gear, and configured to be attached a sprocket.

In accordance with a twentieth aspect of the present invention, the internal transmission is configured so that the hub shell comprises an inner gear which meshes with the output gear.

The internal transmission described above has a high degree of freedom in design.

Also other objects, features, aspects and advantages of the disclosed internal transmission will become apparent to those skilled in the art from the following detailed description, which, taken in conjunction with the annexed drawings, discloses illustrative embodiments of the internal transmission.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
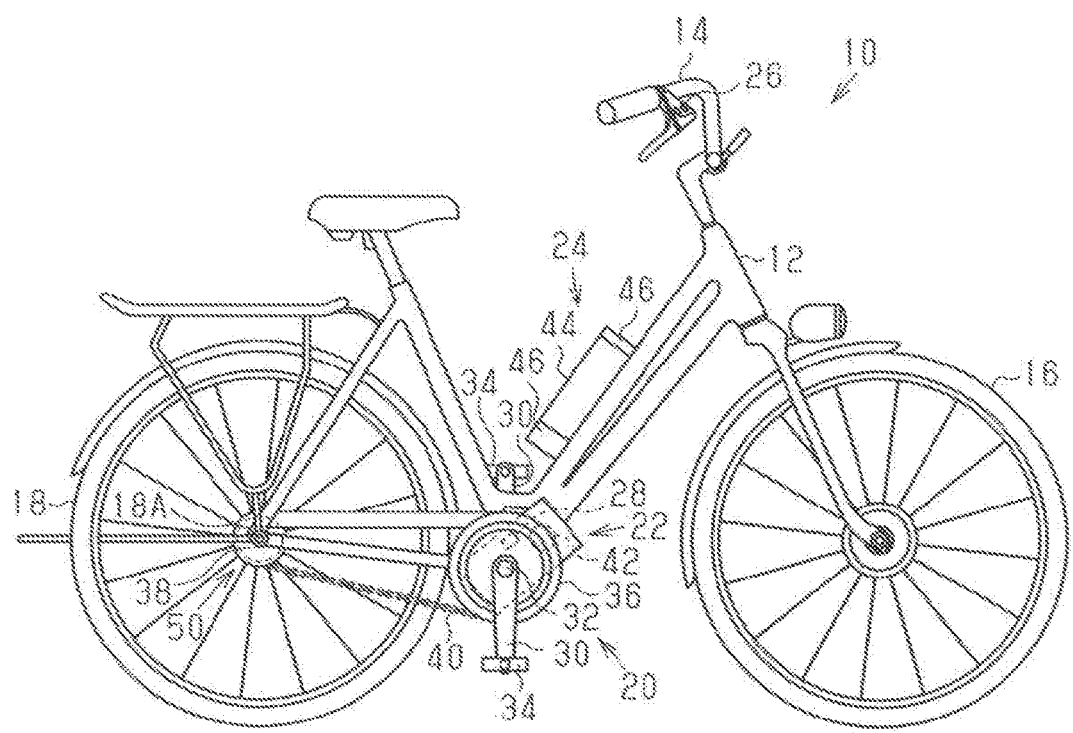
FIG. 1 is a side elevational view of a bicycle equipped with the internal transmission of the embodiment.

FIG. 1 is a side view of a bicycle 10 equipped with an internal transmission 50. The bicycle 10 comprises a frame 12, a handlebar 14, a front wheel 16, a rear wheel 18, a drive mechanism 20, an assist mechanism 22, a battery unit 24, a shift operation device 26, a controller 28, and an internal transmission 50.

The drive mechanism 20 comprises left and right crank arms 30, a crankshaft 32, left and right pedals 34, a front sprocket 36, a rear sprocket 38, and a chain 40. The left and right crank arms 30 are rotatably attached to the frame 12 via one crankshaft 32. The pedals 34 are attached to the crank arms 30 so as to be rotatable around a pedal shaft of a respective one of the crank arms 30.

The front sprocket 36 is coupled with the crankshaft 32. The front sprocket 36 is provided coaxially with the crankshaft 32. The front sprocket 36 can be coupled so as to not rotate relative to the crankshaft 32, or coupled via a one-way clutch (not shown) so that the front sprocket 36 will also rotate a forward drive direction when the crankshaft 32 rotates the forward drive direction.

The rear sprocket 38 is rotatably attached around an axle 18A of the rear wheel 18. The rear sprocket 38 is coupled to the rear wheel 18 via the internal transmission 50.

The chain 40 is wound to the front sprocket 36 and the rear sprocket 38. When the crank arms 30 are rotated by the manual drive force which is applied to the pedals 34, the rear wheel 18 is rotated by the front sprocket 36, the chain 40, and the rear sprocket 38.

The assist mechanism 22 comprises an assist motor 42 and a reduction gear (not shown). The assist mechanism 22 assists the manual drive force which rotates the front sprocket 36 with the drive of the assist motor 42. The assist mechanism 22 comprises a sensor (not shown) for detecting the manual drive force which is inputted from the crankshaft 32. The assist mechanism 22 drives the assist motor 42 according to the manual drive force. The assist motor 42 is, for example, an electric motor. The rotation of the assist motor 42 is transmitted to the front sprocket 36 via the reduction gear. A one-way clutch (not shown) can be arranged between the assist motor 42 and the front sprocket 36 for preventing the assist motor 42 from being rotated by the manual drive force when the crank arms 30 rotate in the forward drive direction.

The battery unit 24 comprises a battery 44 and a battery holder 46 for detachably attaching the battery 44 to the frame 12. The battery 44 includes one or a plurality of battery cells. The battery 44 is formed of a secondary battery. The battery 44 is electrically connected to the assist motor 42 and an internal transmission 50, and supplies electric power to the assist motor 42 and the internal transmission 50.

The shift operation device 26 comprises, for example, a plurality of buttons, and is electrically connected to the internal transmission 50. The internal transmission 50 switches the gear shift stage by a user operating a button of the shift operation device 26.

The controller 28 drives the assist motor 42, raises the output of the assist motor 42, stops the assist motor 42, or reduces the output of the assist motor 42, based on an operation of an assist operating unit (not shown).

The internal transmission 50 changes the speed of rotation of the rear sprocket 38 (refer to FIG. 1). The internal transmission 50 is integrated with a hub of an axle 18A of the rear wheel 18 (refer to FIG. 1), and comprises a plurality of gear shift stages.

Figure 2:
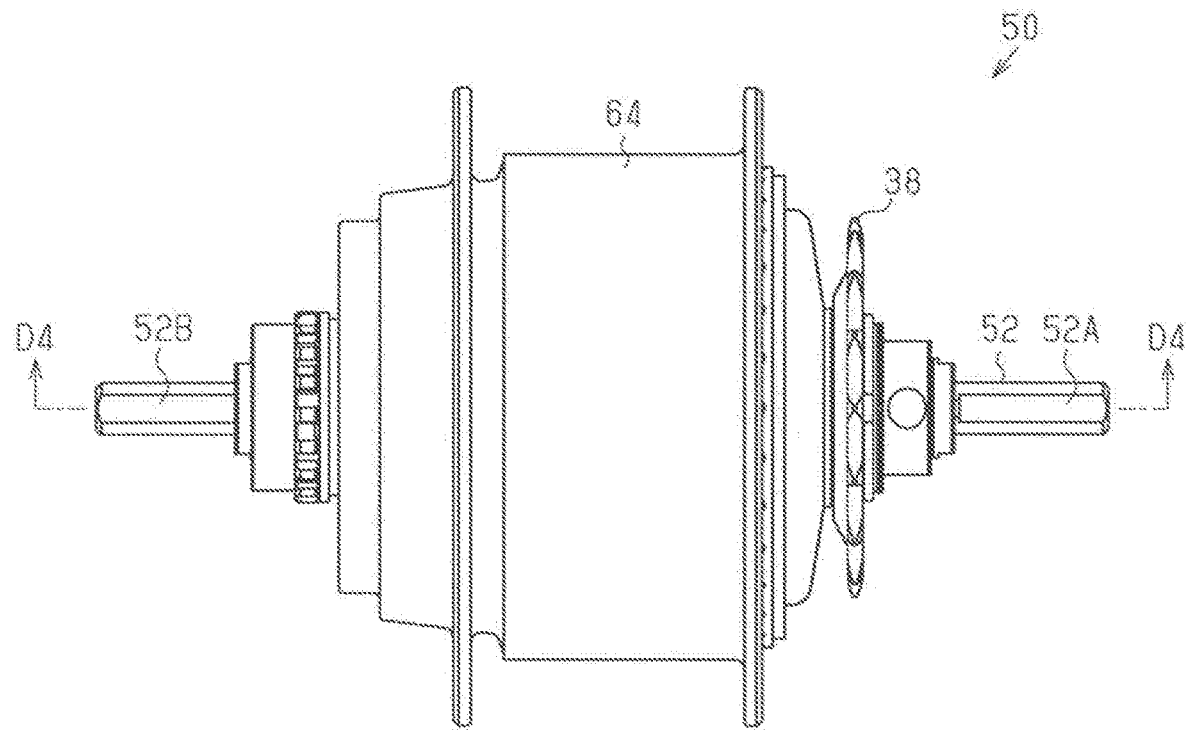
FIG. 2 is a front elevational view of the internal transmission illustrated in FIG. 1.
Figure 3:
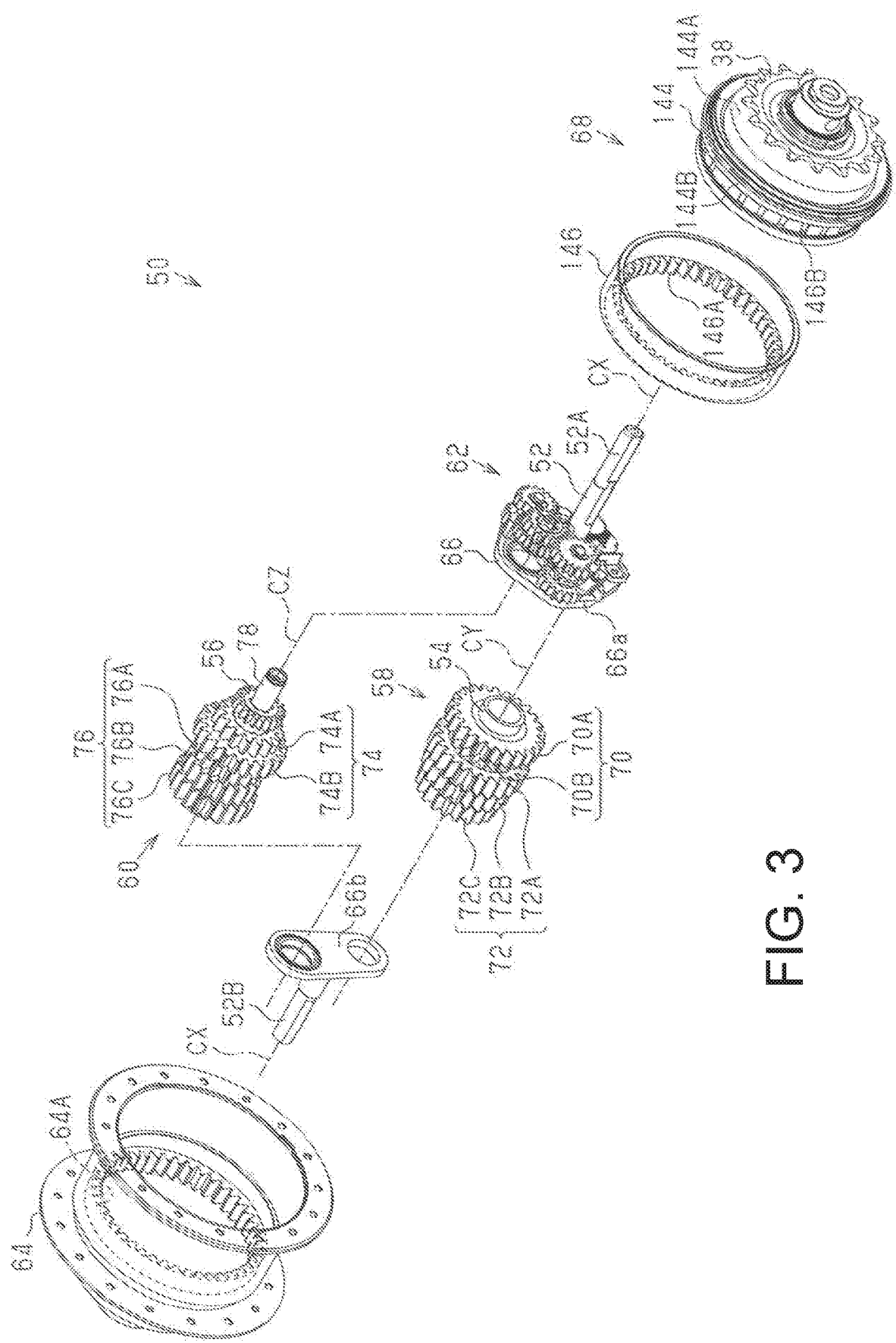
FIG. 3 is an exploded perspective view of the internal transmission illustrated in FIGS. 1 and 2.

As shown in FIG. 2 or FIG. 3, the internal transmission 50 comprises a hub shaft 52, a first shaft 54, a second shaft 56, a plurality of first rotating bodies 58, a plurality of second rotating bodies 60, a clutch mechanism 62, a hub shell 64, a support member 66, and a drive unit 68.

Figure 4:
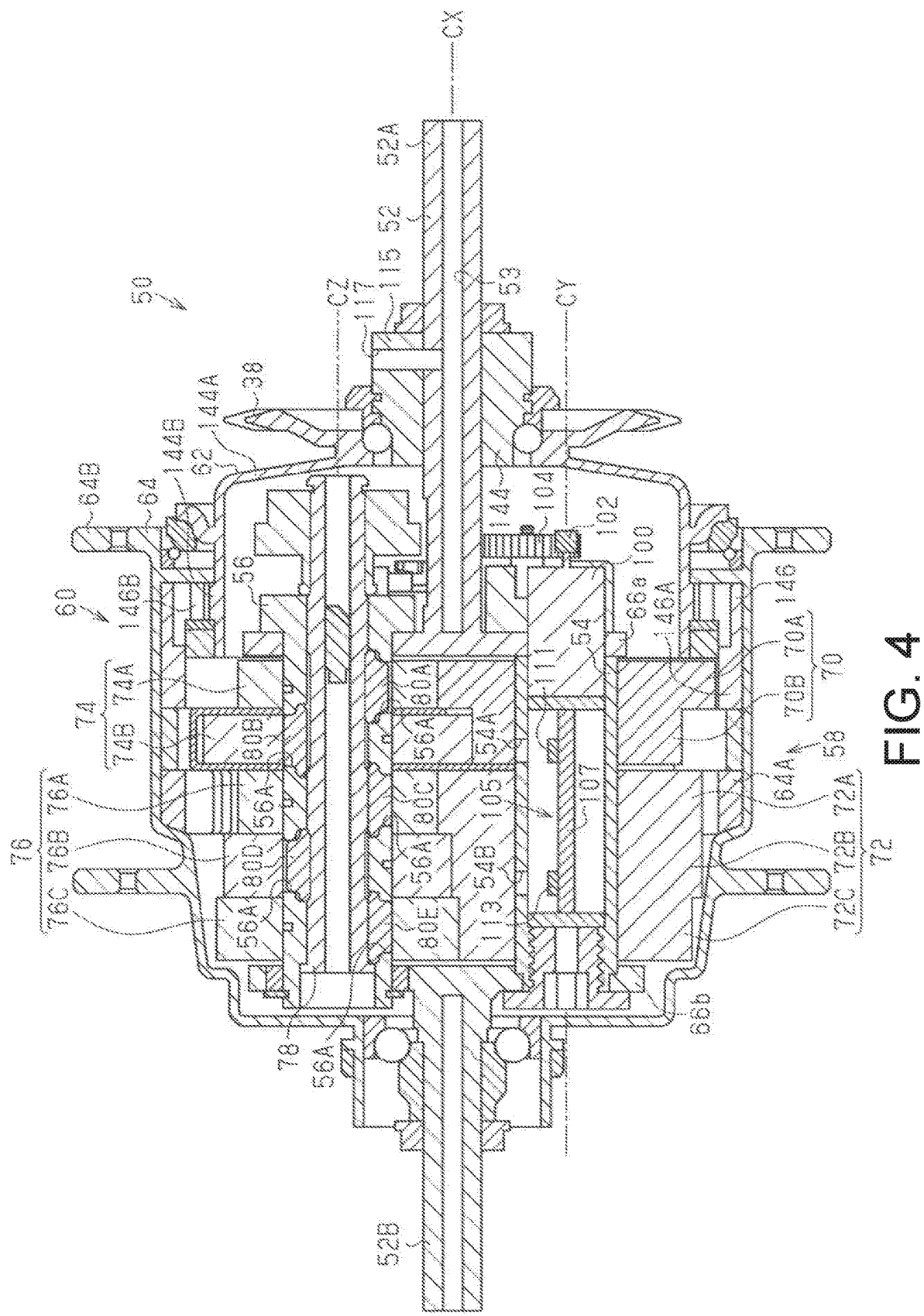
FIG. 4 is a cross-sectional view the transmission illustrated in FIGS. 1 to 3 as seen along section line D4-D4 of FIG. 2.

The hub shaft 52 shown in FIGS. 2, 3 and 4 is configured to be attached to the frame 12 of the bicycle 10 (refer to FIG. 1). The hub shaft 52 comprises a first hub shaft 52A, and a second hub shaft 52B which is separated from the first hub shaft 52A. The first hub shaft 52A protrudes in one of the axial directions of the hub shell 64. The second huh shaft 52B protrudes in the other axial direction of the hub shell 64. The first hub shaft 52A and the second hub shaft 52B are coaxial. The support member 66 comprises a support member 66a and a support member 66b. The support member 66a is coupled to the first hub shaft 52A. The support member 66b is coupled to the second hub shaft 52B. The support members 66a and 66b are arranged at an interval in the hub shaft direction. The support member 66a supports the end of the first hub shaft 52A on the side with the second hub shaft 52B. The support member 66b supports the end of the second hub shaft 52B on the side with the first hub shaft 52A. The support member 66a and the support member 66b extend in the radial direction of the hub shaft 52.

The first shaft 54 is arranged separated from an axis CX of the hub shaft 52, and is non-rotatably arranged around the axis CX of the hub shaft 52. The first shaft 54 is formed to be hollow. The distance between the hub shaft 52 and the first shaft 54 in the radial direction of the hub shell 64, and the distance between the hub shaft 52 and the second shaft 56 in the radial direction of the hub shell 64, are substantially equal. The two ends of the first shaft 54 are supported by the support members 66a and 66b and fixed to the support members 66a and 66b. The first shaft 54 is non-rotatably arranged around an axis CY of the first shaft 54. The support members 66a and 66b are coupled via the first shaft 54 and the relative movement of the support member 66a and the support member 66b is inhibited. A connecting member can be further arranged as well for coupling the support member 66a and the support member 66b.

The second shaft 56 is arranged separated from the axis CX of the hub shaft 52 and the axis CY of the first shaft 54. The second shaft 56 is non-rotatably arranged around the axis CX of the hub shaft 52. The second shaft 56 is a hollow shaft which rotatably supports the second rotating bodies 60. The axis CY of the first shaft 54 and an axis CZ of the second shaft 56 are disposed symmetrically with respect to the axis CX of the hub shaft 52. The two ends of the second shaft 56 are supported by the support members 66a and 66b, respectively. The second shaft 56 is rotatably arranged around the axis CZ of the second shaft 56.

The first rotating bodies 58 shown in FIGS. 2 and 3 are arranged coaxially with the first shaft 54, and are rotatably arranged around the axis CY of the first shaft 54. The first rotating bodies 58 are rotatably supported to the first shaft 54. The first rotating bodies 58 are disposed between the support member 66a and the support member 66b. The first rotating bodies 58 comprise a plurality of input gears 70 to which are inputted a rotation, and a plurality of output gears 72 which output the rotation to the hub shell 64. A bearing can be arranged between each of the first rotating bodies 58 and the first shaft 54. Each gear used in the internal transmission 50 of the present embodiment can be formed of a metal or can be formed of a synthetic resin.

The input gears 70 comprise a first input gear 70A and a second input gear 70B, which have diameters different from each other. The first input gear 70A has a larger diameter than the second input gear 70B. The first input gear 70A has a larger number of teeth than the second input gear 70B. The first input gear 70A and the second input gear 70B are integrally formed. The first input gear 70A is disposed in a position closer to the first hub shaft 52A than the second input gear 70B in the axial direction of the first shaft 54. The first input gear 70A and the second input gear 70B can be formed in one piece, or be formed as separate bodies and fixed to each other.

The output gears 72 comprise a first output gear 72A, a second output gear 72B, and a third output gear 72C, which have diameters different from each other. The first output gear 72A has a larger diameter than the second output gear 72B and the third output gear 72C. The second output gear 72B has a larger diameter than the third output gear 72C. The number of teeth becomes greater in the order of the first output gear 72A, the second output gear 72B, and the third output gear 72C. The first output gear 72A, the second output gear 72B, and the third output gear 72C are integrally formed. The first output gear 72A is arranged further on the first hub shaft 52A side than the second output gear 72B. The first output gear 72A is disposed between the flanges 64B of the hub shell 64 in the hub shaft direction.

The first output gear 72A is disposed in a position closer to the first hub shaft 52A than the second output gear 72B and the third output gear 72C in the axial direction of the first shaft 54.

The second output gear 72B is disposed in a position closer to the first hub shaft 52A than the third output gear 72C in the axial direction of the first shaft 54; in other words, disposed between the first output gear 72A and the third output gear 72C, in the axial direction of the first shaft 54. The first output gear 72A, the second output gear 72B, and the third output gear 72C can be formed in one piece, or be formed as separate bodies and fixed to each other.

The second rotating bodies 60 are arranged coaxially with the second shaft 56, and are respectively coupled to the first rotating bodies 58. The second rotating bodies 60 are disposed between the support member 66a and the support member 66b. The second rotating bodies 60 are rotatably arranged around the axis CZ of the second shaft 56. The second rotating bodies 60 comprise a plurality of input side gears 74 which respectively mesh with the input gears 70, and a plurality of output side gears 76 which respectively mesh with the output gears 72.

The input side gears 74 comprise a first input side gear 74A and a second input side gear 74B, which have diameters different from each other.

The first input side gear 74A has a smaller diameter than the second input side gear 74B. The first input side gear 74A has a smaller number of teeth than the second input side gear 74B. The first input side gear 74A is disposed in a position closer to the first hub shaft 52A than the second input side gear 74B, in the axial direction of the first shaft 54. The first input side gear 74A meshes with the first input gear 70A. The second input side gear 74B meshes with the second input gear 70B.

The output side gears 76 comprise a first output side gear 76A, a second output side gear 76B, and a third output side gear 76C, which have diameters different from each other.

The first output side gear 76A has a smaller diameter than the second output side gear 76B and the third output side gear 76C. The second output side gear 76B has a smaller diameter than the third output side gear 76C. The number of teeth becomes smaller in the order of the first output side gear 76A, the second output side gear 76B, and the third output side gear 76C.

The first output side gear 76A is disposed in a position closer to the first hub shaft 52A than the second output side gear 76B and the third output side gear 76C, in the axial direction of the first shaft 54. The second output side gear 76B is disposed in a position closer to the first hub shaft 52A than the third output side gear 76C, in the axial direction of the first shaft 54. In other words, the second output side gear 76B is disposed between the first output side gear 76A and the third output side gear 76C, in the axial direction of the first shaft 54. The first output side gear 76A meshes with the first output gear 72A. The second output side gear 76B meshes with the second output gear 72B. The third output side gear 76C meshes with the third output gear 72C.

Figure 5:
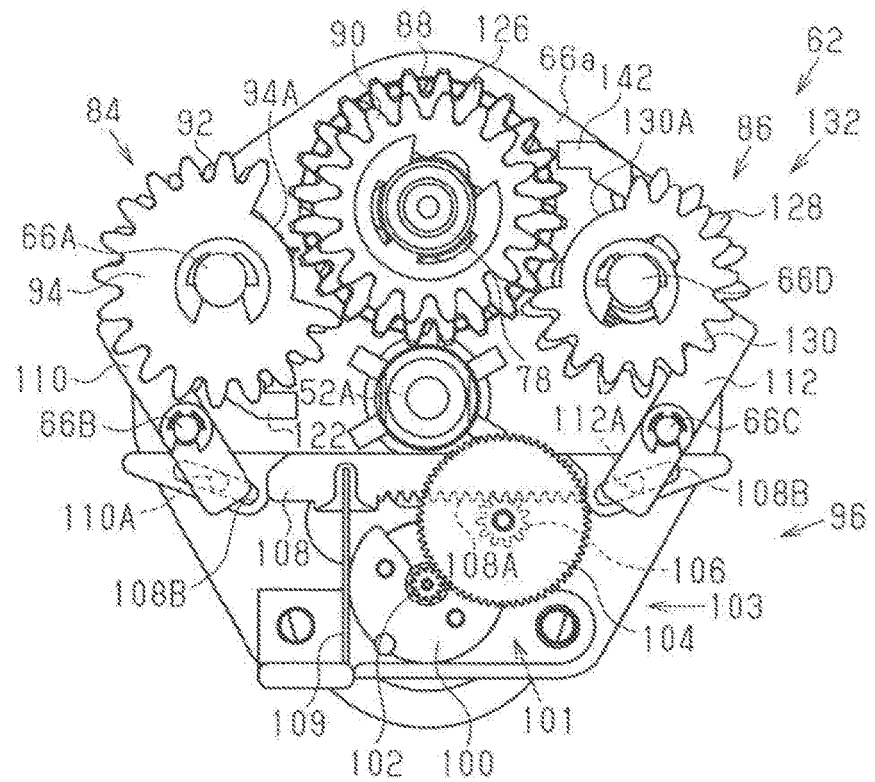
FIG. 5 is a front elevational view of the clutch mechanism of the internal transmission illustrated in FIGS. 1 to 4.
Figure 6:
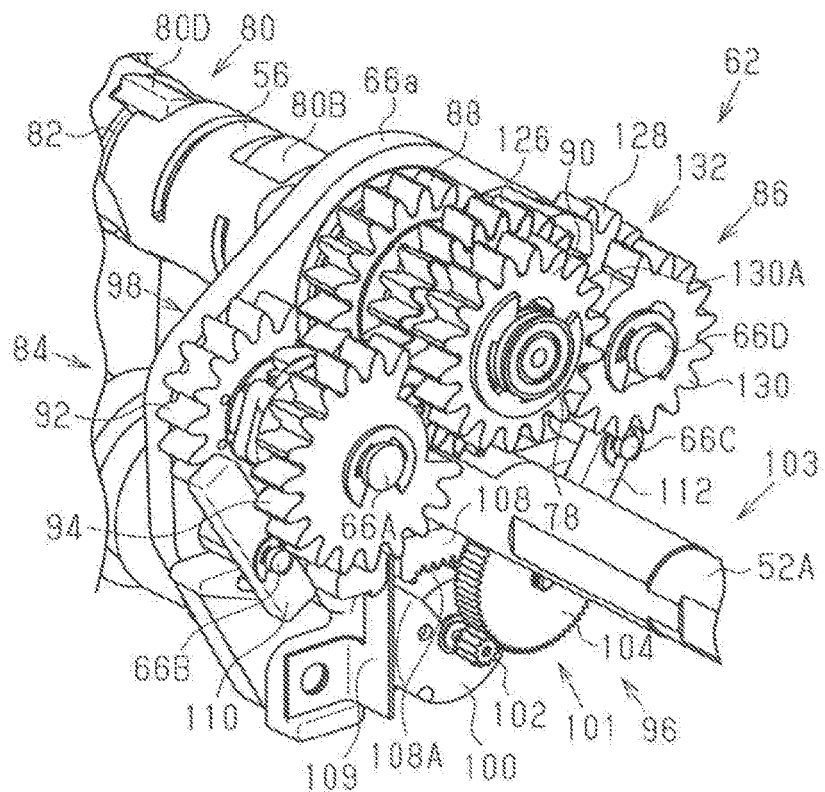
FIG. 6 is a perspective view of the clutch mechanism illustrated in FIG. 5.

The clutch mechanism 62 shown in FIGS. 5 and 6 controls the rotation state of the second rotating body 60 around the axis CZ of the second shaft 56. The clutch mechanism 62 comprises a control shaft 78, a plurality of engagement parts 80, a plurality of springs 82, a speed increasing mechanism 84, and a speed reducing mechanism 86.

Figure 9:
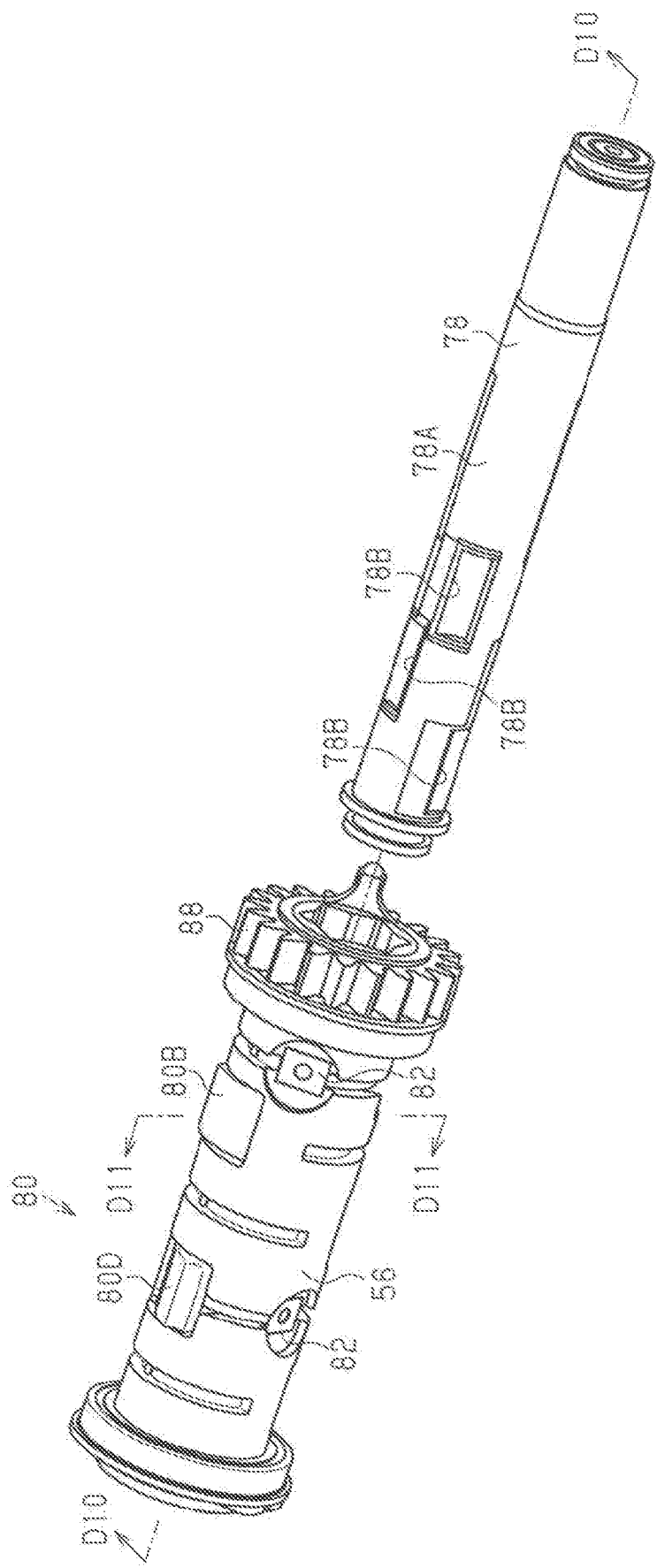
FIG. 9 is an exploded perspective view of the second shaft and the control shaft of the internal transmission illustrated in FIGS. 1 to 4.
Figure 10:
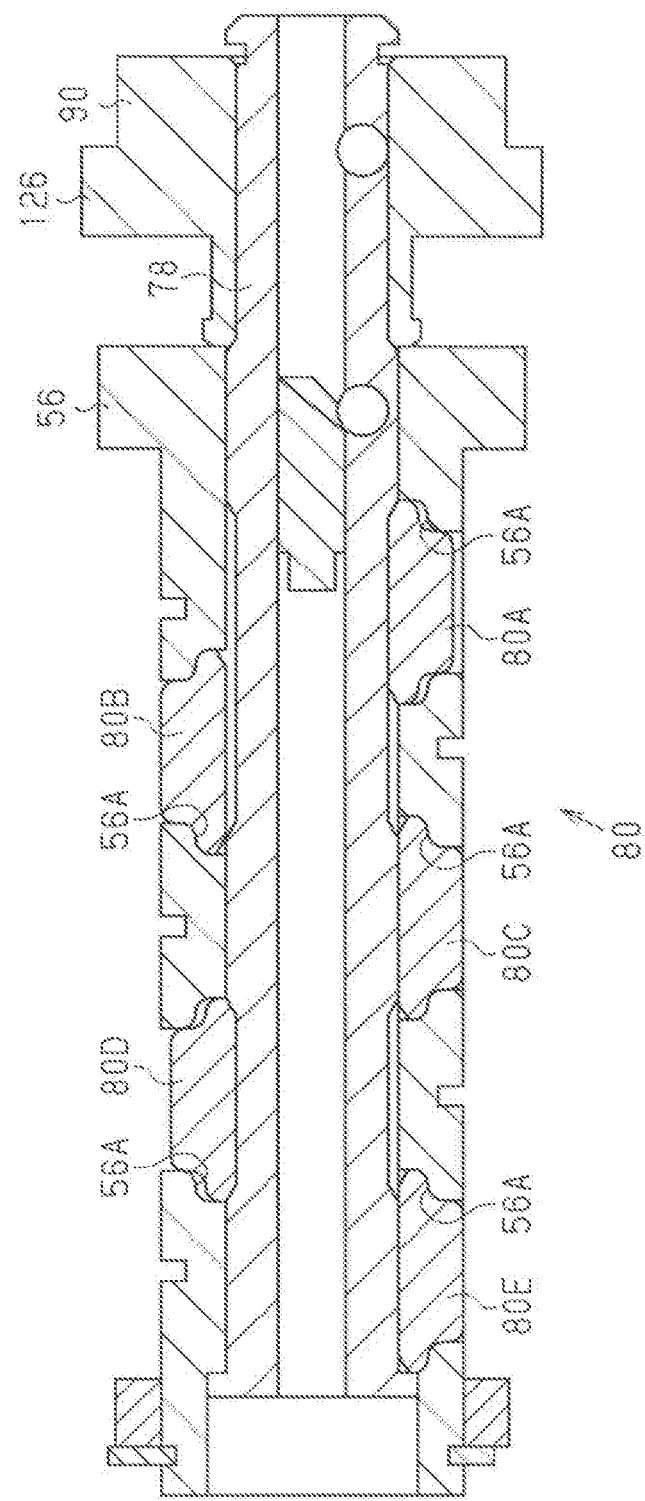
FIG. 10 is a cross-sectional view of the second shaft and the control shaft as seen along section line D10-D10 of FIG. 9 in a state in which the control shaft is housed in the second shaft.

The control shaft 78 shown in FIGS. 9 and 10 is disposed in the hollow second shaft 56 and is rotatably arranged with respect to the second shaft 56. The control shaft 78 is arranged coaxially with the second shaft 56, and configured to be rotated with the second shaft 56. At least a part of the control shaft 78 in the axial direction is disposed in the hollow second shaft 56. The control shaft 78 comprises a first control portion 78A and a second control portion 78B, which control the engagement part 80. The first control portion 78A is a part of a cylindrical outer perimeter surface of the control shaft 78. The second control portion 78B is a recess formed on the outer perimeter surface of the control shaft 78. The second control portion 78B is arranged in a position corresponding to the engagement part 80 in the axial direction of the second shaft 56.

The engagement parts shown in FIGS. 9 and 10 are the pawl-shaped members. The engagement part 80 selectively transmits the rotation of either the first input side gear 74A or the second input side gear 74B to the second shaft 56. The engagement part 80 selectively transmits the rotation of the second shaft 56 to one of the first output side gear 76A, the second output side gear 76B, and the third output side gear 76C.

The engagement parts 80 comprise a first engagement part 80A, a second engagement part 80B, a third engagement part 80C, a fourth engagement part 80D, and a fifth engagement part 80E, which are disposed side-by-side in the axial direction of the second shaft 56 and the control shaft 78. The engagement parts 80 are respectively disposed in a plurality of openings 56A, which are formed on the outer perimeter part of the second shaft 56. Each of the openings 56A extends through the outer perimeter part and the inner perimeter part of the second shaft 56. Each of the openings 56A is arranged in a position corresponding to each of the first input side gear 74A, the second input side gear 74B, the first output side gear 76A, the second output side gear 76B, and the third output side gear 76C, in the axial direction of the second shaft 56. Each of the openings 56A which are adjacent to each other in the axial direction of the second shaft 56 is preferably formed spaced apart in the circumferential direction of the second shaft 56.

As shown in FIG. 4, among the openings 56A, the first engagement part 80A is disposed in the opening 56A which is present on the inner perimeter side of the first input side gear 74A. Among the openings 56A, the second engagement part 80B is disposed in the opening 56A which is present on the inner perimeter side of the second input side gear 74B. Among the openings 56A, the third engagement part 80C is disposed in the opening 56A which is present on the inner perimeter side of the first output side gear 76A. Among the openings 56A, the fourth engagement part 80D is disposed in the opening 56A which is present on the inner perimeter side of the second output side gear 76B. Among the openings 56A, the fifth engagement part 80D is disposed in the opening 56A which is present on the inner perimeter side of the third output side gear 76C.

As shown in FIG. 9, the distal ends of the engagement parts 80 are biased to protrude from the openings 56A, by a plurality of springs 82 as the elastic members which are attached to the outer perimeter of the second shaft 56. An engaged portion 75 (refer to FIGS. 11A and 11B) which configured to engage with the engagement part 80 is formed on the inner perimeter part of the input side gears 74 and the inner perimeter part of the output side gears 76. The engaged portion 75 comprises at least one recess or protrusion. In the present embodiment, the engaged portion 75 is configured so that the recesses and protrusions are formed to be arranged alternately in the circumferential direction. The engaged portion 75 may be formed of the ratchet teeth as well.

Figure 11A:
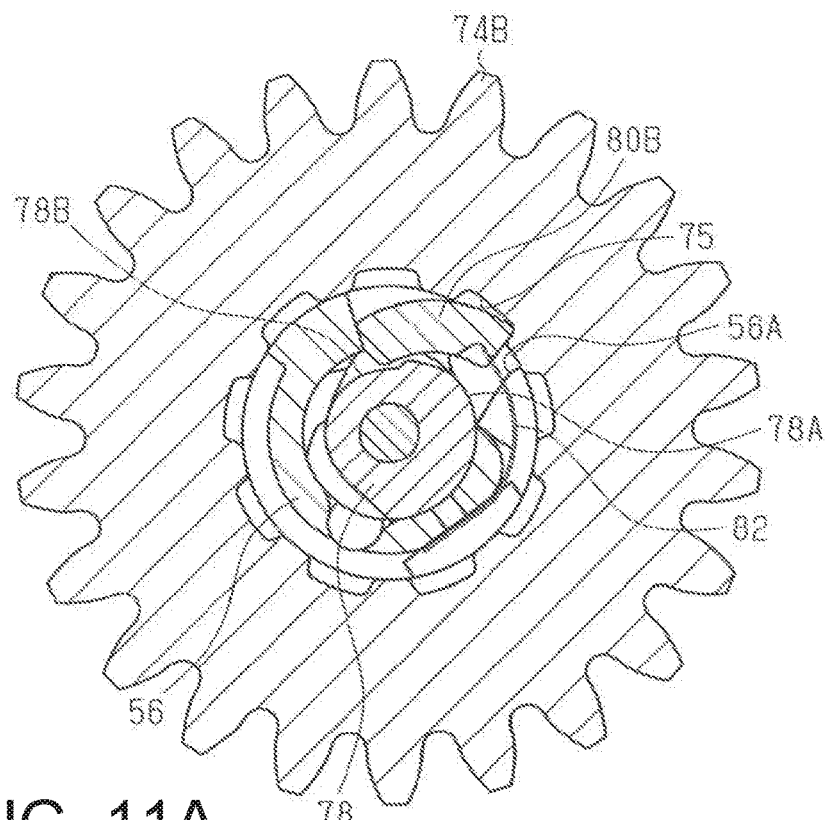
FIG. 11A is a cross-sectional view of the second shaft and the control shaft as seen along section line D11-D11 of FIG. 9 in a state in which the control shaft is housed in the second shaft and the second engagement part is in the first state.

As shown in FIG. 11A, for example, when the second engagement part 80B and the second control portion 78B are opposed, the distal end of the second engagement part 80B is biased by the spring 82, protrudes from the opening 56A, and engages with the engaged portion 75. For this reason, in a first state in which the second engagement part 80B protrudes from the opening 56A, the second engagement part 80B and the second input side gear 74B mesh.

Figure 11B:
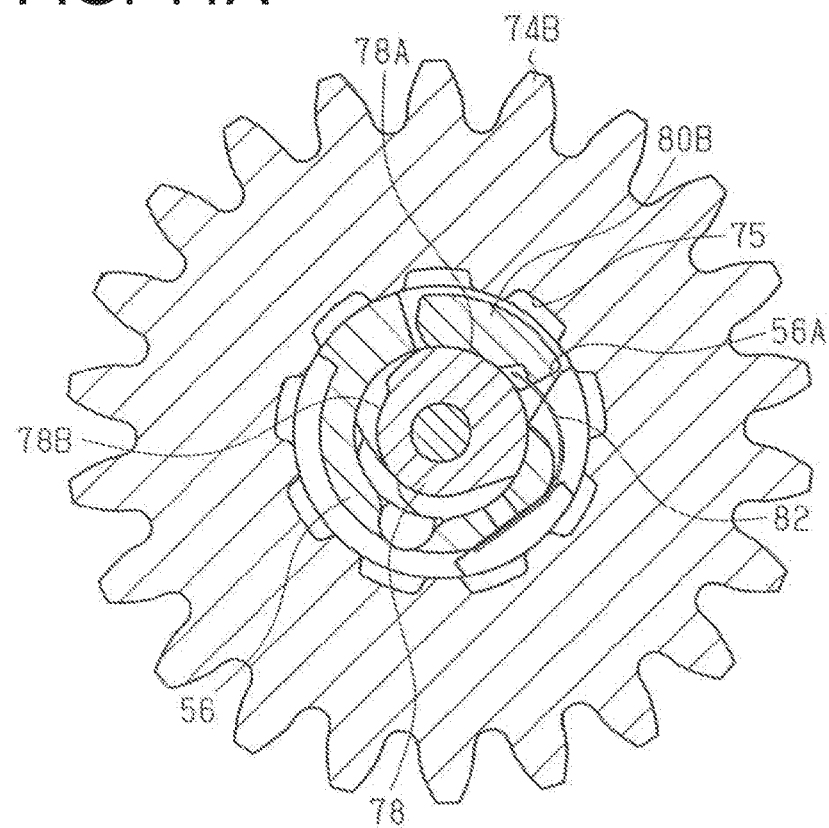
FIG. 11B is cross-sectional view of the second shaft and the control shaft as seen along section line D11-D11 of FIG. 9 in a state in which the control shaft is housed in the second shaft and the second engagement part is in the second state.

As shown in FIG. 11B, for example, when the second engagement part 80B and the first control portion 78A are opposed, the proximal end of the second engagement part 80B is pushed in the radial direction of the second shaft 56 by the first control portion 78A. For this reason, the distal end of the second engagement part 80B is retracted in the opening 56A against the biasing force of the spring 82. For this reason, in a second state in which the second engagement part 80B is retracted in the opening 56A, the second engagement part 80B and the second input side gear 74B do not mesh.

FIGS. 11A and 11B show a coupled state and an uncoupled state of the second engagement part 80B and the second input side gear 74B; the same applies to the coupling and the uncoupling of the other engagement parts 80 and the corresponding input side gear 74 or the output side gear 76 thereof. That is, when the engagement part 80 faces the first control portion 78A, the engagement part 80 is pushed in the radial direction of the second shaft 56 by contacting the first control portion 78A, and moved to the retracted position. On the other hand, when the engagement part 80 faces the second control portion 78B, the proximal end of the engagement part 80 is moved to the recess of the engaged portion 75 and the distal end of the engagement part 80 is moved to the protruding position. The proximal end of the engagement part 80 can be in contact or can be not in contact with the second control portion 78B.

By rotating with respect to the second shaft 56, the control shaft 78 switches between a first state in which each engagement part 80A-80E protrudes from the opening 56A, and a second state in which each engagement part 80A-80E is retracted in the opening 56A.

When in the first state, the first engagement part 80A configures a one-way clutch along with the first input side gear 74A. When in the first state, the second engagement part 80B configures a one-way clutch along with the second input side gear 74B. When in the first state, the third engagement part 80C configures a one-way clutch along with the first output side gear 76A. When in the first state, the fourth engagement part 80D configures a one-way clutch along with the second output side gear 76B. When in the first state, the fifth engagement part 80E configures a one-way clutch along with the third output side gear 76C. When the rear sprocket 38 is rotated in the direction in which the bicycle 10 moves forward, this type of one-way clutch functions so that power is transmitted from the input side gear 74 to the engagement part 80, and from the engagement part 80 to the output side gear 76.

That is, even if the first engagement part 80A is in the first state, if the rotational speed of the second shaft 56 is higher than the rotational speed of the first input side gear 74A, the first engagement part 80A does not engage with the first input side gear 74A, and the first input side gear 74A is freely rotatable. Even if the second engagement part 80B is in the first state, if the rotational speed of the second shaft 56 is higher than the rotational speed of the second input side gear 74B, the second engagement part 80B does not engage with the second input side gear 74B, and the second input side gear 74B is freely rotatable. Even if the third engagement part 80C is in the first state, if the rotational speed of the second shaft 56 is lower than the rotational speed of the first output side gear 76A, the third engagement part 80C does not engage with the first output side gear 76A, and the first output side gear 76A is freely rotatable. Even if the fourth engagement part 80D is in the first state, if the rotational speed of the second shaft 56 is lower than the rotational speed of the second output side gear 76B, the fourth engagement part 80D does not engage with the second output side gear 76B and the second output side gear 76B is freely rotatable. Even if the fifth engagement part 80E is in the first state, if the rotational speed of the second shaft 56 is lower than the rotational speed of the third output side gear 76C, the fifth engagement part 80E does not engage with the third output side gear 76C, and the third output side gear 76C is freely rotatable.

The speed increasing mechanism 84 shown in FIG. 5 or FIG. 6 increases the speed of the rotation of the second shaft 56 and provides the same to the control shaft 78. The speed increasing mechanism 84 comprises a first synchronizing gear 88, a second synchronizing gear 90, a first auxiliary gear 92, a second auxiliary gear 94, a switching drive unit 96, and a first switching unit 98. The speed increasing mechanism 84 is disposed on the opposite side of the support member 66b, with respect to the support member 66a. The speed increasing mechanism 84 is disposed between the support member 66a and the rear sprocket 38 (refer to FIG. 3).

The first synchronizing gear 88 is attached to the end of the second shaft 56. The first synchronizing gear 88 is configured to be integrally rotated with the second shaft 56. The second synchronizing gear 90 is attached to the end of the control shaft 78. The second synchronizing gear 90 is configured to be integrally rotated with the control shaft 78. The first synchronizing gear 88 is arranged to the end of the second shaft 56 on the side with the rear sprocket 38, and is disposed on the opposite side of the support member 66b with respect to the support member 66a. The second synchronizing gear 90 is arranged to the end of the control shaft 78 on the side with the rear sprocket 38, and is disposed on the opposite side of the support member 66b with respect to the support member 66a. The diameter of the second synchronizing gear 90 is smaller than the diameter of the first synchronizing gear 88.

Figure 7:
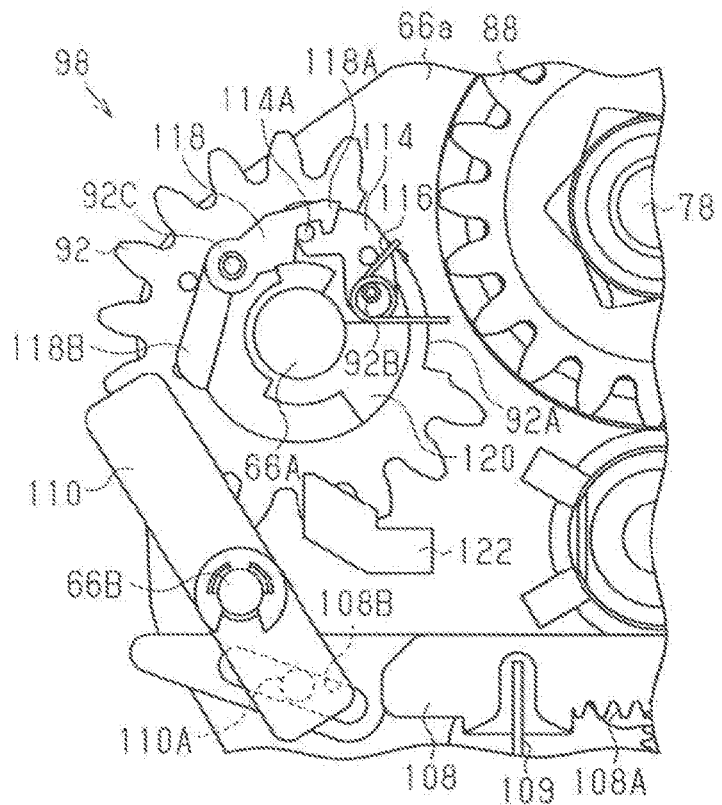
FIG. 7 is an enlarged elevational view of the first switching unit and the periphery of the clutch mechanism illustrated in FIG. 6.

As shown in FIG. 7, the first auxiliary gear 92 is rotatably attached to a support shaft 66A, which is arranged to the support member 66a. A toothless portion 92A is formed in the first auxiliary gear 92, in which the teeth are not present in a part of the outer perimeter thereof. The first auxiliary gear 92 is disposed in a position in which meshing with the first synchronizing gear 88 is possible. The support shaft 66A is arranged parallel to the second shaft 56 and the control shaft 78. When a shifting operation is not being carried out, the toothless portion 92A of the first auxiliary gear 92 is disposed in a position opposing the first synchronizing gear 88, and power is not transmitted between the first synchronizing gear 88 and the first auxiliary gear 92.

As shown in FIGS. 5 and 6, the second auxiliary gear 94 is rotatably attached to a support shaft 66A, which is arranged to the support member 66a. The second auxiliary gear 94 is connected to the first auxiliary gear 92. For this reason, the second auxiliary gear 94 is integrally rotated with the first auxiliary gear 9. The second auxiliary gear 94 is disposed in a position in which meshing with the second synchronizing gear 90 is possible. A toothless portion 94A is formed in the second auxiliary gear 94, in which the teeth are not present in a part of the outer perimeter thereof. When a shifting operation is not being carried out, the toothless portion 94A of the second auxiliary gear 94 is disposed in a position opposing the second synchronizing gear 90, and power is not transmitted between the second synchronizing gear 90 and the second auxiliary gear 94.

The switching drive unit 96 comprises a shifting motor 100, a motor speed reducing mechanism 101, and a conversion mechanism 103. The conversion mechanism 103 converts a rotary motion into a linear motion. The motor speed reducing mechanism 101 comprises a small-diameter gear 102 and a large-diameter gear 104. The small-diameter gear 102 is attached to the output shaft of the shifting motor 100. The large-diameter gear 104 meshes with the small-diameter gear 102. The conversion mechanism 103 comprises a medium-diameter gear 106 and a guide member 108. The medium-diameter gear 106 is integrally rotated with the large-diameter gear 104. The guide member 108 includes the medium-diameter gear 106 and a rack gear 108A. The switching drive unit 96 further comprises a biasing member 109 and a pair of unlocking members 110 and 112. The biasing member 109 is configured to bias the guide member 108 to a neutral position. The unlocking members 110 and 112 are attached to the ends of the guide member 108 in the longitudinal direction.

As shown in FIG. 4, a part of the shifting motor 100 is housed in the inner perimeter part of the first shaft 54. The rotating shaft of the shifting motor 100 is arranged parallel to the axis CX of the hub shaft 52. The shifting motor 100 is controlled by the controller 105. The shifting motor 100 is connected to the controller 105, which is arranged to the inner perimeter part of the first shaft 54. The controller 105 comprises a circuit board 107, an arithmetic circuit, and a memory. The circuit board 107 is connected to electrical wiring (not shown), which passes through the hole 53 formed on the hub shaft 52 and a hole 117 formed on a lock nut 115. The circuit board 107 is connected to the battery 44 and the shift operation device 26 (refer to FIG. 1). The controller 105 can also comprise a wireless communication device and perform wireless communication with the shift operation device 26.

A first through-hole 54A is formed on the first shaft 54, in a position which corresponds to the first input gear 70A or the second input gear 70B. In the present embodiment, the first through-hole 54A is formed in a position corresponding to the second input gear 70B.

Further, a second through-hole 54B is formed on the first shaft 54, in a position which corresponds to one of the first output gear 72A, the second output gear 72B, and the third output gear 72C. In the present embodiment, the second through-hole 54B is formed in a position corresponding to the second output gear 72B.

A first sensor 111 is arranged to the inner perimeter part of the first shaft 54 for detecting the rotational speed of the first input gear 70A or the second input gear 70B. A second sensor 113 is arranged to the inner perimeter part of the first shaft 54 for detecting the rotational speed of one of the first output gear 72A, the second output gear 72B, or the third output gear 72C. The first sensor 111 and the second sensor 113 are arranged to the circuit board 107. The first sensor 111 is arranged to a position corresponding to the first through-hole 54A. The second sensor 113 is arranged to a position corresponding to the second through-hole 54B. The first sensor 111 and the second sensor 113 are formed of a magnetic sensor, an optical sensor, or the like. When the first sensor 111 and the second sensor 113 are formed of a magnetic sensor, a magnet is arranged to the inner perimeter part of the first input gear 70A or the second input gear 70B, and to the inner perimeter part of one of the first output gear 72A, the second output gear 72B, and the third output gear 72C.

A cadence of the crankshaft 32 can be calculated by detecting the rotational speed of the first input gear 70A or the second input gear 70B. The cadence of the crankshaft 32 is calculated based on the number of teeth of the front sprocket 36, the number of teeth of the rear sprocket 38, and the rotational speed of the first input gear 70A or the second input gear 70B.

The travel speed of the bicycle 10 can be calculated by detecting the rotational speed of one of the first output gear 72A, the second output gear 72B, and the third output gear 72C. The travel speed of the bicycle 10 is calculated based on the radius or the diameter of the rear wheel, the number of teeth of the first output gear 72A, the number of teeth of the inner gear 64A (refer to FIG. 3) of the hub shell 64, and the rotational speed of one of the first output gear 72A, the second output gear 72B, and the third output gear 72C.

The controller 105 calculates the cadence of the crankshaft 32 or the travel speed of the bicycle 10 based on a program which is set in advance and stored in the memory. Further, the controller 105 calculates the transmission ratio of the internal transmission 50 from the rotational speed of the first input gear 70A or the second input gear 70B, and the rotational speed of one of the first output gear 72A, the second output gear 72B, and the third output gear 72C, to identify the current gear shift stage. The correspondence between the transmission ratio and the gear shift stage is stored in the memory in advance. When a gear changing signal for increasing the transmission ratio is inputted from the shift operation device 26, the controller 105 drives the shifting motor 100 so that the transmission ratio will become larger if the current transmission ratio is not the maximum transmission ratio. On the other hand, when a gear changing signal for decreasing the transmission ratio is inputted from the shift operation device 26, the controller 105 drives the shifting motor 100 so that the transmission ratio will become smaller if the current transmission ratio is not the minimum transmission ratio. A lid which is formed of a material that transmits magnetism or a material that transmits light may be attached to the first through-hole 54A and the second through-hole 54B. The internal space of the first shaft 54 to which is arranged the controller 105 is preferably sealed for waterproofing.

The guide member 108 moves along a direction in which the rack gear 108A extends with the rotation of the shifting motor 100 based on a signal from the shift operation device 26 (refer to FIG. 1) being transmitted to the small-diameter gear 102, the large-diameter gear 104, and the medium-diameter gear 106, in that order. When the guide member 108 moves along the direction in which the rack gear 108A extends, the biasing member 109 comes in contact with the guide member 108 and biases the guide member 108 in a direction to return to the initial position.

The first unlocking member 110 shown in FIGS. 5 and 6 is rotatably attached around a support shaft 66B, which is arranged to the support member 66a. The support shaft 66B is arranged parallel to the support shaft 66A. A support shaft 110A is arranged to one end of the first unlocking member 110. The support shaft 110A is parallel to the support shaft 66A. The support shaft 110A is movably inserted into an elongated opening 108B, which is formed at one end of the guide member 108 in the longitudinal direction. When the guide member 108 is moved, the support shaft 110A is guided to the elongated opening 108B, and the first unlocking member 110 is rotated around the support shaft 66B.

The second unlocking member 112 is rotatably attached around a support shaft 66C, which is arranged to the support member 66a. The support shaft 66C is arranged parallel to the support shaft 66A. A support shaft 112A is arranged to one end of the second unlocking member 112. The support shaft 2A is parallel to the support shaft 66C. The support shaft 112A is movably inserted into an elongated opening 108B, which is formed at the other end of the guide member 108 in the longitudinal direction. When the guide member 108 is moved, the support shaft 112A is guided to the elongated opening 108B, and the second unlocking member 112 is rotated around the support shaft 66C.

The first switching unit 98 shown in FIG. 7 switches between a state in which the first auxiliary gear 92 meshes with the first synchronizing gear 88, and a state in which the first auxiliary gear 92 does not mesh with the first synchronizing gear 88. The first switching unit 98 comprises a first key member 114, a spring 116, a locking member 118, a key support member 120, and a guide portion 122. In FIG. 7, a drawing of the second auxiliary gear 94 is omitted.

The first key member 114 is rotatably attached around a support shaft 92B, which is arranged to the first auxiliary gear 92. The support shaft 92B is arranged parallel to the support shaft 66A. The support shaft 92B supports the proximal end of the first key member 114. A projection 114A is formed at the distal end of the first key member 114. The first key member 114 protrudes to the toothless portion 92A of the first auxiliary gear 92. The first key member 114 is arranged so as to be able to move between a protruding position and a retracted position. In the protruding position, the first key member 114 comes in contact with the first synchronizing gear 88. The retracted position is a position in which the first key member 114 does not come in contact with the first synchronizing gear 88.

The spring 116 is attached around the support shaft 92B, and biases the first key member 114 in a direction in which the tip of the first key member 114 protrudes to the protruding position. The spring 116 is formed of a torsion spring.

The locking member 118 is rotatably attached around a support shaft 92C, which is arranged to the first auxiliary gear 92, and comprises an engagement part 118A and a release portion 118B. The support shaft 92C is arranged parallel to the support shaft 66A. The support shaft 92C is arranged between the engagement part 118A and the release portion 118B.

The engagement part 118A has a pawl-shaped tip, and is configured to engage with the projection 114A at the tip of the first key member 114, when the first key member 114 is in the retracted position. The release portion 118B is integrally rotated with the engagement part 118A around the support shaft 92C. By being pushed by the first unlocking member 110 and being rotated in one direction, the release portion 118B moves the tip of the engagement part 118A outward of the first auxiliary gear 92, and releases the state in which the tip of the engagement part 118A and the projection 114A of the first key member 114 are engaged.

The key support member 120 is integrally formed with the first auxiliary gear 92. When the first key member 114 is in the protruding position, the key support member 120 inhibits the rotation of the first key member 114 around the support shaft 92B in a direction in which the first key member 114 moves from the retracted position to the protruding position, and supports the first key member 114. The first auxiliary gear 92 is configured to thereby be rotated in one direction, when the first key member 114 is rotated in one direction around the support shaft 66A.

The guide portion 122 is attached to the support member 66. The guide portion 122 moves the first key member 114 from the protruding position to the retracted position by the first auxiliary gear 92 being rotated. If the first auxiliary gear 92 is rotated when the first key member 114 is in the protruding position, the first key member 114 is rotated in the other direction around the support shaft 92B, by the first key member 114 coming in contact with the guide portion 122. When the first key member 114 is moved to the retracted position, the first key member 114 is held in the retracted position again, by the engagement part 118A engaging with the projection 114A.

The speed reducing mechanism 86 shown in FIG. 5 or FIG. 6 reduces the speed of the rotation of the second shaft 56 and provides the same to the control shaft 78. The speed reducing mechanism 86 comprises a third synchronizing gear 126, a third auxiliary gear 128, a fourth auxiliary gear 130, and a second switching unit 132. The speed reducing mechanism 86 is disposed on the opposite side of the support member 66b, with respect to the support member 66a. The speed reducing mechanism 86 is disposed between the support member 66a and the rear sprocket 38.

The third synchronizing gear 126 is attached to the end of the control shaft 78 and is integrally rotated with the control shaft 78. The third synchronizing gear 126 is attached further outward than the second synchronizing gear 90 in the axial direction of the control shaft 78. The third synchronizing gear 126 is arranged to the end of the control shaft 78 on the rear sprocket 38 side, and disposed on the opposite side of the support member 66b with respect to the support member 66a. The third synchronizing gear 126 has a larger number of teeth than the second synchronizing gear 90. The diameter of the third synchronizing gear 126 is larger than the diameter of the first synchronizing gear 88. The diameter of the third synchronizing gear 126 is larger than the second auxiliary gear 94. The third synchronizing gear 126 may be integrally formed with the second synchronizing gear 90.

Figure 8:
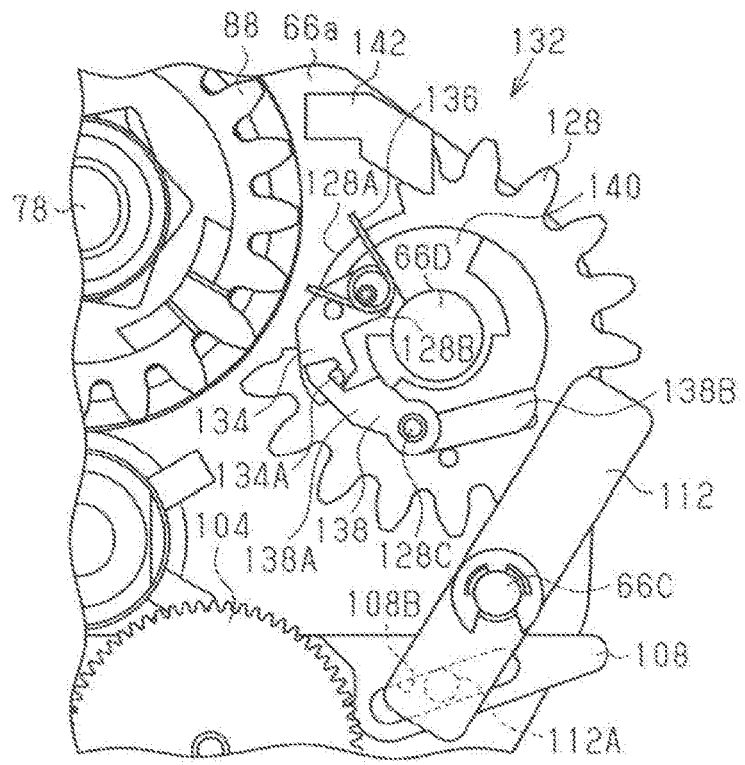
FIG. 8 is an enlarged elevational view of the second switching unit and the periphery of the clutch mechanism illustrated in FIG. 6.

The third auxiliary gear 128 shown in FIG. 8 is rotatably attached to a support shaft 66D, which is arranged to the support member 66a. A toothless portion 128A is formed in the third auxiliary gear 128, in which the teeth are not present in a part of the outer perimeter thereof. The third auxiliary gear 128 is disposed in a position in which meshing with the third synchronizing gear 126 is possible. In FIG. 8, a drawing of the fourth auxiliary gear 130 is omitted. The support shaft 66D is arranged parallel to the second shaft 56 and the control shaft 78. When a shifting operation is not being carried out, the toothless portion 128A of the third auxiliary gear 128 is disposed in a position opposing the first synchronizing gear 88, and power is not transmitted between the first synchronizing gear 88 and the third auxiliary gear 128.

The second switching unit 132 switches between a state in which the third auxiliary gear 128 meshes with the first synchronizing gear 88, and a state in which the third auxiliary gear 128 does not mesh with the first synchronizing gear 88. The second switching unit 132 comprises a second key member 134, a spring 136, a locking member 138, a key support member 140, and a guide portion 142.

The second key member 134 is rotatably attached around a support shaft 128B, which is arranged to the third auxiliary gear 128. The support shaft 128B is arranged parallel to the support shaft 66D. The support shaft 128B supports the second key member 134. A projection 134A is formed at the distal end of the second key member 134. The second key member 134 protrudes to the toothless portion 128A of the third auxiliary gear 128. The second key member 134 is arranged so as to be movable between a protruding position and a retracted position. In the protruding position, the second key member 134 comes in contact with the first synchronizing gear 88. The retracted position is a position in which the second key member 134 does not come in contact with the first synchronizing gear 88.

The spring 136 is attached around the support shaft 128B, and biases the first key member 114 in a direction in which the tip of the second key member 134 protrudes to the protruding position. The spring 116 is formed of a torsion spring.

The locking member 138 is rotatably attached around a support shaft 128C, which is arranged to the third auxiliary gear 128. The locking member 138 comprises an engagement part 138A and a release portion 138B. The support shaft 128C is arranged parallel to the support shaft 66D. The support shaft 128C is arranged between the engagement part 118A and the release portion 118B.

The engagement part 138A has a pawl-shaped tip, and is configured to engage with the projection 134A at the tip of the first key member 114 when the second key member 134 is in the retracted position. The release portion 138B is integrally rotated with the engagement part 138A around the support shaft 128C. By being pushed by the second unlocking member 112 and being rotated in one direction, the release portion 138B moves the tip of the engagement part 138A outward of the third auxiliary gear 128, and releases a state in which the tip of the engagement part 138A and the projection 134A of the second key member 134 are engaged.

The key support member 140 is integrally formed with the third auxiliary gear 128. When the second key member 134 is in the protruding position, the key support member 140 inhibits the rotation of the second key member 134 around the support shaft 128B in a direction in which the second key member 134 moves from the retracted position to the protruding position, and supports the second key member 134. The third auxiliary gear 128 is configured to thereby be rotated in one direction, when the second key member 134 is rotated in one direction around the support shaft 66D.

The guide portion 142 is attached to the support member 66. The guide portion 142 moves the second key member 134 from the protruding position to the retracted position by the third auxiliary gear 128 being rotated. If the third auxiliary gear 128 is rotated when the second key member 134 is in the protruding position, the second key member 134 is rotated in the other direction around the support shaft 128B, by the second key member 134 coming in contact with the guide portion 142. When the second key member 134 is moved to the retracted position, the second key member 134 is held in the retracted position again, by the engagement part 138A engaging with the projection 134A.

As shown in FIGS. 5 and 6, the fourth auxiliary gear 130 is rotatably attached to a support shaft 66D arranged to the support member 66a. The fourth auxiliary gear 130 is connected to the third auxiliary gear 128. For this reason, the fourth auxiliary gear 130 is integrally rotated with the third auxiliary gear 128. The fourth auxiliary gear 130 is disposed in a position in which meshing with the third synchronizing gear 126 is possible.

A toothless portion 130A is formed in the fourth auxiliary gear 130, in which teeth are not present in a part of the outer perimeter thereof. The diameter of the fourth synchronizing gear 130 is smaller than the second auxiliary gear 94. When a shifting operation is not being carried out, the toothless portion 130A of the fourth auxiliary gear 130 is disposed in a position opposing the third synchronizing gear 126, and power is not transmitted between the third synchronizing gear 126 and the fourth auxiliary gear 130.

As shown in FIGS. 3 and 4, an inner gear 64A which meshes with the first output gear 72A of the output gears 72 is formed on the hub shell 64. The inner gear 64A is formed in an annular shape around the hub shaft 52, in the inner perimeter part of the huh shell 64. The inner gear 64A may be integrally formed with the hub shell 64, or, may be formed as a separate body from the hub shell 64 and fixed to the inner perimeter part of the hub shell 64 by press fitting or the like. The hub shell 64 is rotatably supported to the hub shaft 52. One end of the hub shell 64 in the hub shaft direction is rotatably supported to the drive unit 68 via a beating. The other end of the hub shell 64 in the hub shaft direction is supported to the second hub shaft 52B via a bearing.

The drive unit 68 comprises a driver 144 and an input part 146. The driver 144 is attached the rear sprocket 38. The power from the driver 144 is transmitted to the input part 146. The drive unit 68 is rotatably supported to the first hub shaft 52A via a lock nut 115. The driver 144 is supported to the lock nut 115 via a bearing. A hole 117 is formed to the lock nut 115 for drawing out the wiring. The driver 144 comprises an attaching portion which configured to detachably fix the rear sprocket 38. The driver 144 comprises a side wall portion 144A and an annular portion 144B. The side wall portion 144A covers an opening on the side surface of the hub shell 64. The annular portion 144B extends from the side wall portion 144A to the inner perimeter part of the hub shell 64. The hub shell 64 is rotatably supported to the annular portion 144B via a beating. The hub shell 64 is rotatably arranged around the axis CX of the hub shaft 52 and houses the first shaft 54, the second shaft 56, the first rotating bodies 58, the second rotating bodies 60, and the clutch mechanism 62.

The input unit 146 is connected to the driver 144 via the one-way clutch 146B. The input part 146 is integrally rotated along with the rear sprocket 38 and the driver 144, when the rear sprocket 38 and the driver 144 rotate in the forward drive direction. The input part 146 is formed in an annular shape. An inner gear 146A is formed in the input part 146. The inner gear 146A meshes with the first input gear 70A among the input gears 70. The input part 146 is disposed so that one end thereof in the hub shaft direction surrounds the outer perimeter part of the annular portion 144B. A one-way clutch 146B is arranged between one end in the hub shaft direction and the outer perimeter part of the annular portion 144B. The one-way clutch 146B transmits the rotation of the driver 144 to the input part 146, when the rear sprocket 38 is rotated in a direction in which the bicycle 10 moves forward. The one-way clutch 146B can be formed of a roller clutch, or formed of a pawl type clutch.

The action of the internal transmission 50 will be described. When the crank arm 30 is rotated by the manual drive force which is applied to the pedal 34 shown in FIG. 1, the front sprocket 36, the chain 40, and the rear sprocket 38 are rotated.

The driver 144 is rotated by the rear sprocket 38, shown in FIG. 3 being rotated. The rotation of the driver 144 is transmitted to the input part 146 via the one-way clutch 146B. The rotation of the input part 146 is transmitted to the first input gear 70A, which is meshed with the inner gear 146A of the input part 146, and to the second input gear 70B, which is integrally formed with the first input gear 70A. In other words, the rotation of the input portion 146 to the input gear 70. The rotation of the input gear 70 is transmitted to the input side gear 74 which is meshed with the input gear 70. Of the input side gears 74, the rotation of the first input side gear 74A or the second input side gear 74B which is meshed with the engagement part 80 is transmitted to the second shaft 56 and the control shaft 78. Of the input side gears 74, the first input side gear 74A or the second input side gear 74B which is not meshed with the engagement part 80 is idle around the second shaft 56.

The rotation of the second shaft 56 and the control shaft 78 is transmitted to the first output side gear 76A, the second output side gear 76B, or the third output side gear 76C, which is meshed with the engagement part 80, among the output side gears 76. The two gears of the first output side gear 76A, the second output side gear 76B, and the third output side gear 76C, which are not meshed with the engagement part 80, are idle around the second shaft 56.

The rotation of the output side gear 76 is transmitted to the output gear 72 which is meshed with the output side gear 76. The first output gear 72A, the second output gear 72B, and the third output gear 72C are integrally rotated. The hub shell 64 is rotatably arranged around the axis CX of the hub shaft 52 by the inner gear 64A which is meshed with the first output gear 72A being rotated. The rear wheel 18 (refer to FIG. 1) is rotated by the hub shell 64 being rotated.

When there is a request to change the gear shift stage of the internal transmission 50 by a user operating the shift operation device 26 (refer to FIG. 1), the gear shift stage of the internal transmission 50 is changed by the relative rotational phase of the second shaft 56 and the control shaft 78 being changed.

Figure 12:
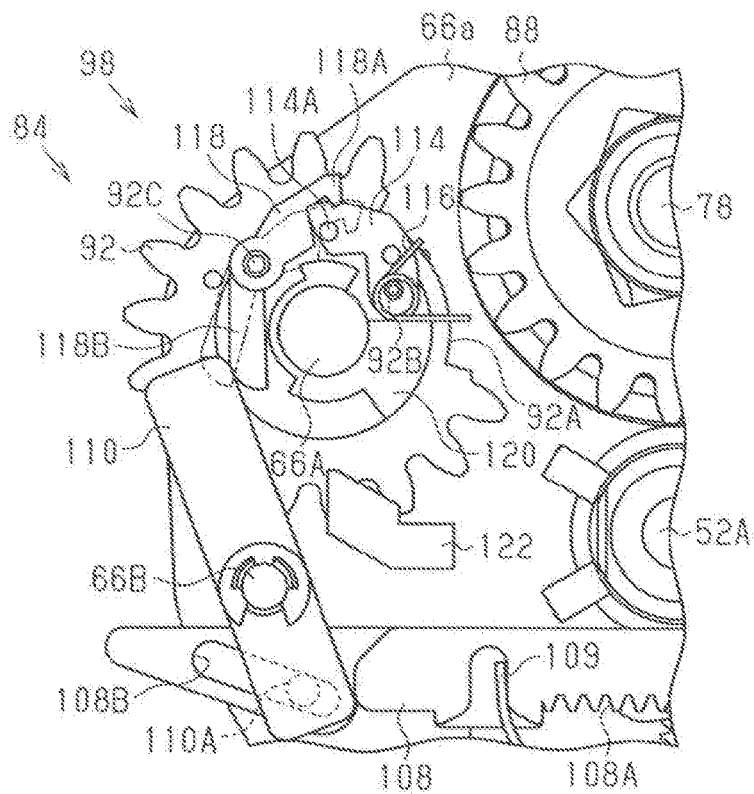
FIG. 12 is an enlarged elevational view of the first switching unit and the peripheral area of the first switching unit, when a first unlocking member is releasing a state in which a locking member and a first key member are engaged.

As shown in FIGS. 5 and 12, for example, when there is a request from the user to increase the transmission ratio of the internal transmission 50, the shifting motor 100 of the switching drive unit 96 is rotated in one direction, and the rotation of the output shaft of the shifting motor 100 is transmitted to the small-diameter gear 102, the large-diameter gear 104, and the medium-diameter gear 106, in that order. The rotation of the medium-diameter gear 106 is transmitted to the rack gear 108A of the guide member 108, and the guide member 108 is moved in one direction. The first unlocking member 110 is rotated around the support shaft 66B in one direction, and the tip of the first unlocking member 110 comes in contact with the release portion 118B of the locking member 118 by the end of the elongated opening 108B of the guide member 108 coming in contact with the support shaft 110A of the first unlocking member 110. The locking member 118 is thereby rotated around the support shaft 92C, and the engagement of the engagement part 118A and the projection 114A of the first key member 114 is released.

Figure 13:
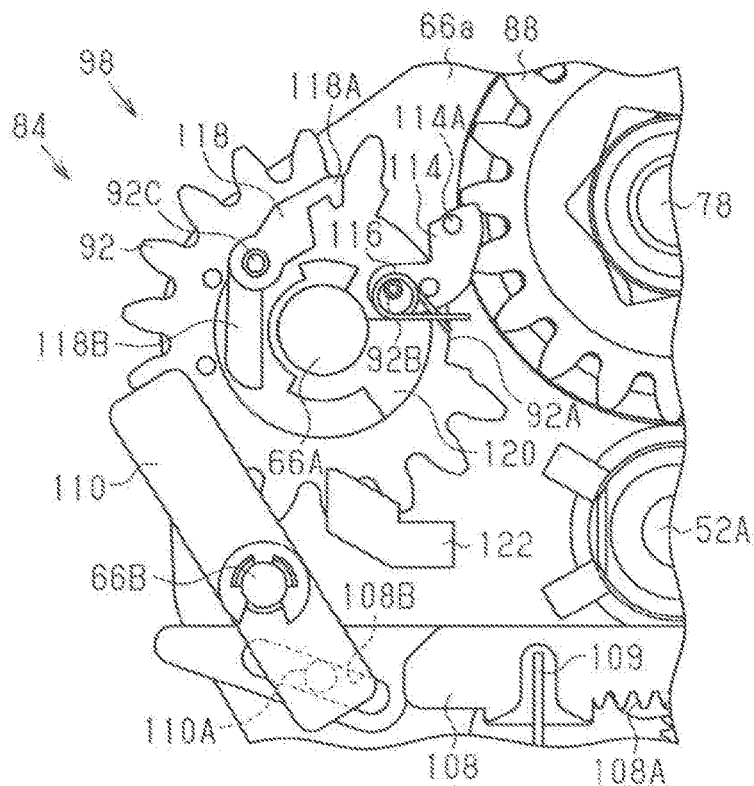
FIG. 13 is an enlarged elevational view of the first switching unit and the periphery of the clutch mechanism, in a state in which the locking member and the first key member are engaged has been released.

As shown in FIG. 13, the first key member 114 is moved from the retracted position to the protruding position by the biasing force of the spring 116, and the first key member 114 is meshed with the first synchronizing gear 88, by the engagement of the engagement part 118A and the projection 114A of the first key member 114 being released.

Figure 14:
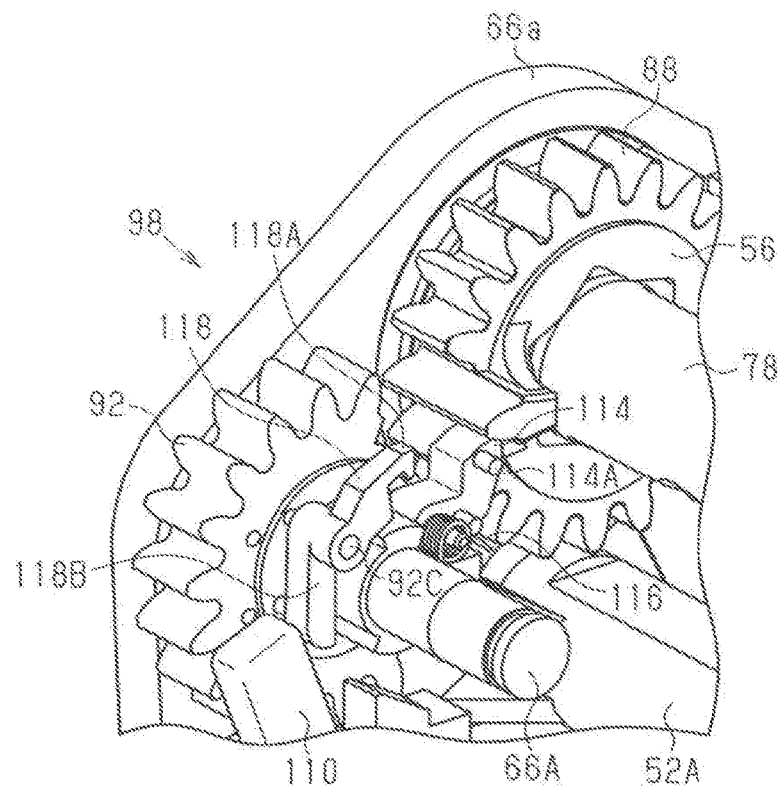
FIG. 14 is a perspective view of the first switching unit and the peripheral area of the first switching unit, in a state in which the first key member and the first synchronizing gear are meshed.
Figure 15:
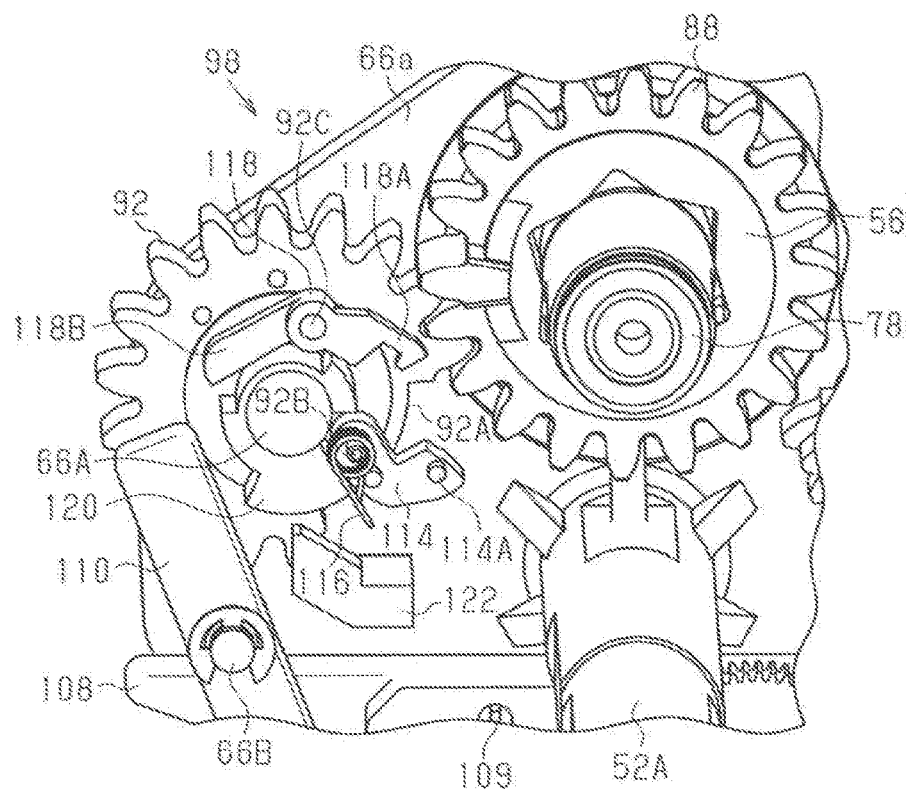
FIG. 15 is an enlarged elevational view of the first switching unit and the peripheral area of the first switching unit, in a state in which the first auxiliary gear and the first synchronizing gear are meshed.

As shown in FIGS. 14 and 15, the first auxiliary gear 92 is rotated and the first auxiliary gear 92 and the first synchronizing gear 88 are meshed, by the rotation of the first synchronizing gear 88 being transmitted to the first key member 114.

Figure 16:
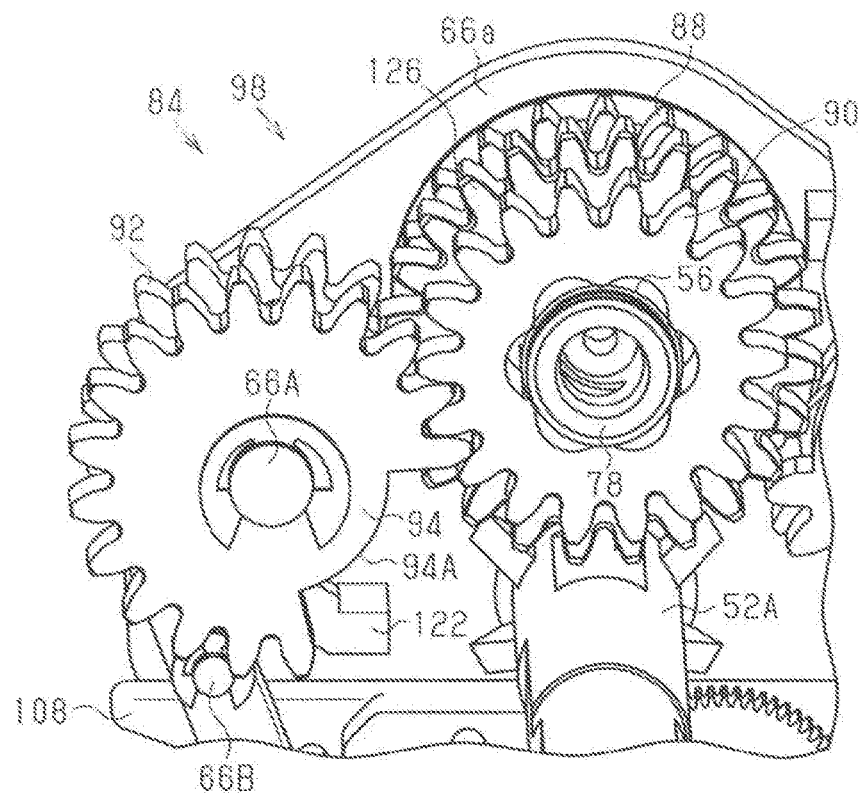
FIG. 16 is an enlarged elevational view of the clutch mechanism, in a state in which the second auxiliary gear and the second synchronizing gear are meshed.

As shown in FIG. 16, along with the first auxiliary gear 92 being rotated, the second auxiliary gear 94 which is connected to the first auxiliary gear 92 is integrally rotated, and the second auxiliary gear 94 is meshed with the second synchronizing gear 90. Since the diameter of the second synchronizing gear 90 is smaller than the diameter of the first synchronizing gear 88, the speed of the rotation of the second shaft 56 is increased and transmitted to the control shaft 78. For this reason, the control shaft 78 is rotated around the axis CZ relative to the second shaft 56, the relative rotational phase of the second shaft 56 and the control shaft 78 is changed, the state of at least one of the engagement parts 80A-80E is changed, and the transmission ratio is increased.

On the other hand, for example, when there is a request from the user to decrease the transmission ratio of the internal transmission 50, the shifting motor 100 of the switching drive unit 96 is rotated in the other direction, and the rotation of the output shaft of the shifting motor 100 is transmitted to the small-diameter gear 102, the large-diameter gear 104, and the medium-diameter gear 106, in that order. The rotation of the medium-diameter gear 106 is transmitted to the rack gear 108A of the guide member 108, and the guide member 108 is moved in the other direction. The second unlocking member 112 is rotated around the support shaft 66C in one direction, and the tip of the second unlocking member 112 comes in contact with the release portion 138B of the locking member 138 by the end of the elongated opening 108B of the guide member 108 coming in contact with the support shaft 112A of the second unlocking member 112. Then, the second switching unit 132 is operated in the same way as the first switching unit 98, and along with the third auxiliary gear 128 being rotated, the fourth auxiliary gear 130 which is connected to the third auxiliary gear 128 is integrally rotated, and the fourth auxiliary gear 130 is meshed with the third synchronizing gear 126. Since the diameter of the third synchronizing gear 126 is larger than the diameter of the first synchronizing gear 88, the speed of the rotation of the second shaft 56 is decreased and transmitted to the control shaft 78. For this reason, the control shaft 78 is rotated around the axis CZ relative to the second shaft 56, the relative rotational phase of the second shaft 56 and the control shaft 78 is changed, the state of at least one of the engagement parts 80A-80E is changed, and the transmission ratio is decreased.

The operation of the first switching unit 98 after the speed of the rotation of the second shaft 56 is increased and transmitted to the control shaft 78 will be described.

Figure 17:
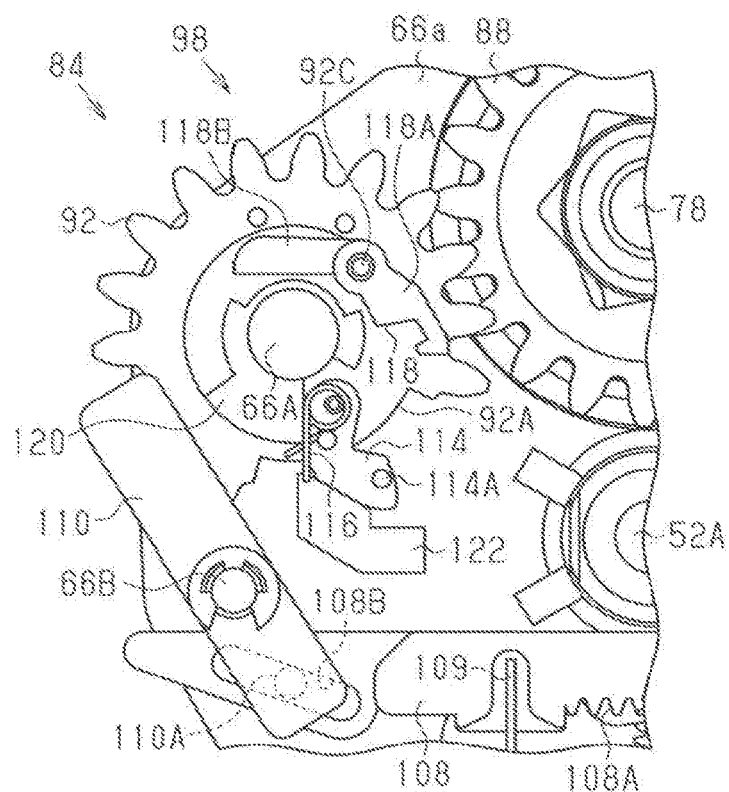
FIG. 17 is an enlarged elevational view of the first switching unit and the peripheral area of the first switching unit, when the first key member is in contact with a guide portion.

As shown in FIG. 17, after the speed of the rotation of the second shaft 56 is increased and transmitted to the control shaft 78, the first key member 114 comes in contact with the guide portion 122 by the first auxiliary gear 92 being rotated by a prescribed angle. When the first auxiliary gear 92 is rotated further in a state in which the first key member 114 and the guide portion 122 are in contact, the first key member 114 moves from the protruding position to the retracted position against the biasing force of the spring 116.

As shown in FIG. 1, the projection 114A of the first key member 114 and the engagement part 118A of the locking member 118 are engaged by the first key member 114 being moved to the retracted position. By the first auxiliary gear 92 being rotated further in a state in which the projection 114A of the first key member 114 and the engagement part 118A of the locking member 118 are engaged, when the first auxiliary gear 92 is rotated to the position at which the toothless portion 92A of the first auxiliary gear 92 opposes the first synchronizing gear 88, the first auxiliary gear 92 and the first synchronizing gear 88 will no longer mesh, and the state becomes that shown in FIG. 7. The rotation of the first auxiliary gear 92 is thereby stopped. Regarding the second switching unit 132, the state becomes that shown in FIG. 8 by a similar operation, and the rotation of the third auxiliary gear 128 is stopped.

When the first auxiliary gear 92 is rotated one rotation, the control shaft 78 is relatively rotated in a first direction around the axis CZ of the second shaft 56, and the relative rotational phase of the second shaft 56 and the control shaft 78 is changed by a prescribed amount. When the fourth auxiliary gear 130 is rotated one rotation, the control shaft 78 is relatively rotated in a second direction around the axis CZ of the second shaft 56, and the relative rotational phase of the second shaft 56 and the control shaft 78 is changed by a prescribed amount. The position of the second control portion 78B on the second shaft 56 is determined in advance so as to shift one stage when the relative rotational phase of the second shaft 56 and the control shaft 78 is changed by a prescribed amount.

Figures 18, 19:
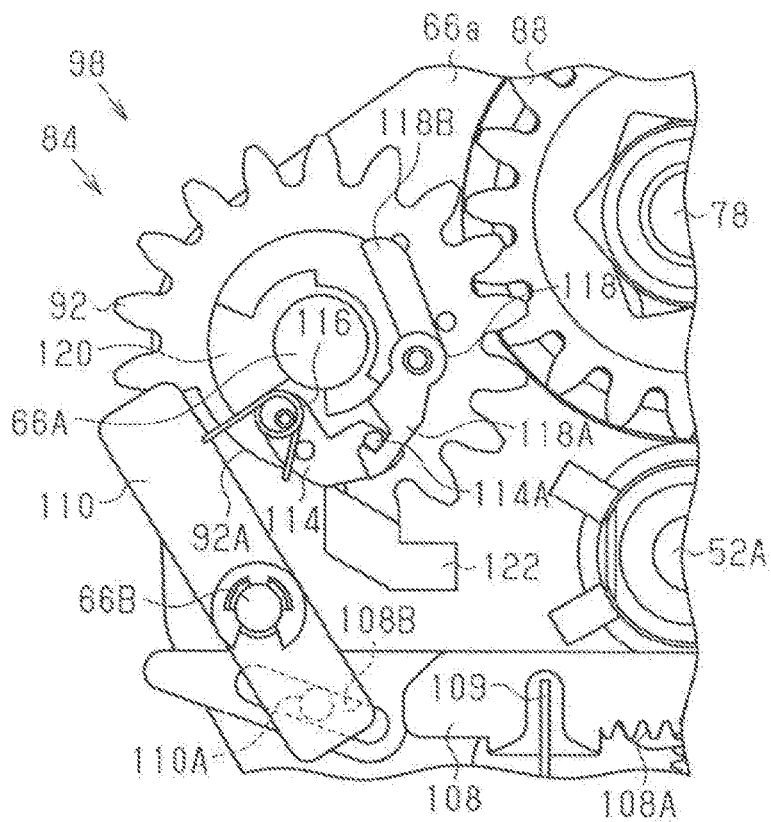
FIG. 18 is an enlarged elevational view of the first switching unit and the peripheral area of the first switching unit, in a state in which the locking member and the first key member are engaged.
FIG. 19 is a table showing the state of the engagement parts corresponding to each gear shift stage.

As shown in FIG. 19, the number of gear shift stages of the internal transmission 50 of the present embodiment is six. In FIG. 19, "up" indicates that the corresponding engagement part 80 is in a first state, and "down" indicates that the corresponding engagement part 80 is in a second state.

In stage one, the first engagement part 80A which can engage with the first input side gear 74A, and the third engagement part 80C which can engage with the first output side gear 76A, are put in a first state, and the second engagement part 80B, the fourth engagement part 80D, and the fifth engagement part 80E are put in a second state.

In stage two, the first engagement part 80A which can engage with the first input side gear 74A, and the fourth engagement part 80D which can engage with the second output side gear 76B, are put in a first state, and the second engagement part 80B, the third engagement part 80C, and the fifth engagement part 80E are put in a second state.

In stage three, the first engagement part 80A which can engage with the first input side gear 74A, and the fifth engagement part 80E which can engage with the third output side gear 76C, are put in a first state, and the second engagement part 80B, the third engagement part 80C, and the fourth engagement part 80D are put in a second state.

In stage four, the second engagement part 80B which can engage with the second input side gear 74B, and the third engagement part 80C which can engage with the first output side gear 76A, are put in a first state, and the first engagement part 80A, the fourth engagement part 80D, and the fifth engagement part 80E are put in a second state.

In stage five, the second engagement part 80B which can engage with the second input side gear 74B, and the fourth engagement part 80D which can engage with the second output side gear 76B, are put in a first state, and the first engagement part 80A, the third engagement part 80C, and the fifth engagement part 80E are put in a second state.

In stage six, the second engagement part 80B which can engage with the second input side gear 74B, and the fifth engagement part 80E which can engage with the third output side gear 76C, are put in a first state, and the first engagement part 80A, the third engagement part 80C, and the fourth engagement part 80D are put in a second state.

For example, when changing from stage 3 to stage 4, the speed of the rotation of the second shaft 56 is increased by the speed increasing mechanism 84 and transmitted to the control shaft 78, and the fifth engagement part 80E which can engage with the third output side gear 76C is changed from the first state to the second state. Then the second engagement part 80B which can engage with the second input side gear 74B is changed from the first state to the second state.

In stage 4, stage 5, and stage 6, the first engagement part 80A which can engage with the first input side gear 74A, can be in the first state or the second state. In stage 4, stage 5, and stage 6, the rotational speed of the second input side gear 74B is higher than the rotational speed of the first input side gear 74A. For this reason, since the rotational speed of the second shaft 56 becomes higher than the rotational speed of the first input side gear 74A, even if the first engagement part 80A is in the first state, the first engagement part 80A will not engage with the first input side gear 74A. Therefore, the first engagement part 80A is not required to be controlled by the control shaft 78.

Further, in state 2, stage 3, stage 5, and stage 6, the third engagement part 80C which can engage with the first output side gear 76A, can be in the first state or the second state. In stage 2, stage 3, stage 5, and stage 6, the rotational speed of the second output side gear 76B or the third output side gear 76C is higher than the rotational speed of the first output side gear 76A. For this reason, since the rotational speed of the second shaft 56 becomes lower than the rotational speed of the first output side gear 76A, even if the third engagement part 80C is in the first state, the third engagement part 80C will not engage with the first output side gear 76A. Therefore, the third engagement part 80C is not required to be controlled by the control shaft 78.

If the engagement parts 80 are required to be operated when shifting, the engagement parts 80 which should be operated can be configured to move at roughly the same time, or configured so that the engagement parts 80 which should be switched from the first state to the second state are operated, after which the engagement parts 80 which should be switched from the second state to the first state are operated. By setting the position of the second control portion 78B around the control shaft 78 beforehand, the operation timing of the engagement part 80 can be set.

According to the internal transmission 50, for example, the following effects can be obtained.

(1) The internal transmission 50 comprises the first shaft 54 and the second shaft 56 which are arranged separated from the axis CX of the hub shaft 52. The first rotating body 58 is attached to the first shaft 54, and a second rotating body 60 is attached to the second shaft 56. For this reason, the internal transmission 50 has a high degree of freedom in design.

(2) The speed increasing mechanism 84 and the first switching unit 98 of the clutch mechanism 62 increase the speed of the rotation of the second shaft 56 by the manual drive force and transmits the same to the control shaft 78, and changes the gear shift stage of the internal transmission 50. In this manner, since the internal transmission 50 performs shifting by using a manual drive force with a large force, shifting becomes easier.

(3) The speed increasing mechanism 84 and the second switching unit 132 of the clutch mechanism 62 decrease the speed of the rotation of the second shaft 56 by the manual drive force and transmits the same to the control shaft 78, and changes the gear shift stage of the internal transmission 50. In this manner, since the internal transmission 50 performs shifting by using a manual drive force with a large force, shifting becomes easier.

Modified Example

The description relating to the above-described embodiment is an example of forms that the internal transmission according to the present invention can take, and is not intended to limit the forms thereof. The internal transmission according to the present invention may, in addition to the embodiment, take the forms of the modified examples of the embodiment shown below, as well as forms that combine at least two modified examples that are not mutually contradictory.

In a modified example of the internal transmission 50, at least one of the input gear 70 and the output gear 72 is integrally rotated with the first shaft 54.

A modified example of the internal transmission 50 comprises a sprocket or a pulley instead of the gear of the first rotating body 58 and the second rotating body 60. In the internal transmission 50 of this modified example, the first rotating body 58 and the second rotating body 60 are coupled by a chain or a belt, and a reverse rotation mechanism for reversing the direction of rotation is arranged between the drive unit 68 and the first rotating body 58, or, between the second rotating body 60 and the hub shell 64. A reverse rotation mechanism can be realized by, for example, a plurality of gears.

In a modified example of the internal transmission 50, the second input gear 70B is omitted. In the internal transmission 50 of this modified example, the second input side gear 74B, the second engagement part 80B corresponding to the second input side gear 74B, the second control portion 78B, and the opening 56A are also omitted. That is, the number of gear shift stages of the internal transmission 50 of this modified example is three.

In a modified example of the internal transmission 50, at least one of the second output gear 72B and the third output gear 72C is omitted. When omitting the second output gear 72B, the second output side gear 76B, as well as the corresponding fourth engagement part 80D, the second control portion 78B, and the opening 56A are also omitted. When omitting the third output gear 72C, the third output side gear 76C, as well as the corresponding fifth engagement part 80E, the second control portion 78B, and the opening 56A are also omitted. When one gear is omitted, the number of gear shift stages of the internal transmission 50 of this modified embodiment is three. When two gears are omitted, the number of gear shift stages of the internal transmission 50 of this modified embodiment is four.

In a modified example of the internal transmission 50, the first input side gear 74A or the second input side gear 74B is omitted. When omitting the first input side gear 74A, the engagement part 80A corresponding to the first input side gear 74A, the second control portion 78B, and the opening 56A are also omitted. When omitting the second input side gear 74B, the second input gear 70B, the second engagement part 80B corresponding to the second input side gear 74B, the second control portion 78B, and the opening 56A are also omitted. That is, the number of gear shift stages of the internal transmission 50 of this modified example is three.

In a modified example of the internal transmission 50, one gear or two gears among the first output side gear 76A, the second output side gear 76B, and the third output side gear 76C are omitted. When omitting the first output side gear 76A, the engagement part 80A corresponding to the first output side gear 76A, the second control portion 78B, and the opening 56A are also omitted. When omitting the second output side gear 76B, the fourth engagement part 80D corresponding to the first output side gear 76A, the second control portion 78B, and the opening 56A are also omitted, and the second output gear 72B may also be omitted. When omitting the third output side gear 76C, the fifth engagement part 80E corresponding to the third output side gear 76C, the second control portion 78B, and the opening 56A are also omitted, and the third output gear 72C may also be omitted. When one gear is omitted, the number of gear shift stages of the internal transmission 50 of this modified embodiment is four. When two gears are omitted, the number of gear shift stages of the internal transmission 50 of this modified embodiment is two.

In a modified example of the internal transmission 50, the speed increasing mechanism 84, the switching drive unit 96, the first switching unit 98, the speed reducing mechanism 86, and the second switching unit 132 are omitted. In the internal transmission 50 of this modified example, the relative rotational phase of the control shaft 78 with respect to the second shaft 56 is changed by an actuator such as an electric motor rotating the control shaft 78 directly or via a motor speed reducing mechanism, to change the gear shift stage of the internal transmission 50.

In a modified example of the internal transmission 50, the distance between the hub shaft 52 and the first shaft 54 in the radial direction of the hub shell 64, and the distance between the hub shaft 52 and the second shaft 56 in the radial direction of the hub shell 64, are different.

In a modified example of the internal transmission 50 the axis CY of the first shaft 54 and the axis CZ of the second shaft 56 are not disposed symmetrically with respect to the axis CX of the hub shaft 52.

The internal transmission 50 of a modified example may be shifted so that the transmission ratio becomes lower by the speed increasing mechanism 84, and shifted so that the transmission ratio becomes higher by the speed reducing mechanism 86.

In a modified example of the internal transmission 50, the input gear 70 and the input side gear 74 can each be formed of three or more gears, and the output gear 72 and the output side gear 76 may each be formed of four or more gears.

In a modified example of the internal transmission 50, an engagement part 80 is arranged to the control shaft 78, and the engagement part 80 is switched between the first state and the second state by the second shaft 56. In this modified example, each of the positions of the openings 56A in the circumferential direction of the second shaft 56 is different, and, of the first engagement part 80A-fifth engagement part 80E, the engagement parts 80 which face the opening 56A are in the first state, and the engagement parts 80 which do not face the opening 56A are in the second state.

The rear sprocket 38 is arranged coaxially with the hub shaft 52, but the rear sprocket 38 may also be arranged to rotate around a different axis than the hub shaft 52. In the internal transmission 50, for example, a rear sprocket 38 may be arranged coaxially with the first shaft 54.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are arranged for illustration only, and not for the purpose of limiting the invention as defined by the appended claims and their equivalents.

What is claimed is:

1. An internal transmission comprising:
   a hub shaft configured to be attached to a frame of a bicycle;
   a first shaft separated from an axis of the hub shaft and arranged to be non-rotatable around the axis of the hub shaft;
   a second shaft separated from the axis of the hub shaft and from an axis of the first shaft, and the second shaft being non-rotatable around the axis of the hub shaft;
   a plurality of first rotating bodies coaxially arranged with the first shaft and rotatably arranged around the axis of the first shaft, the plurality of first rotating bodies comprising an input gear to which a rotation is inputted and an output gear which outputs the rotation to a hub shell;
   a plurality of second rotating bodies coaxially arranged with the second shaft, the second rotating bodies being coupled to each of the first rotating bodies, and the second rotating bodies being rotatably arranged around an axis of the second shaft;
   a clutch mechanism which controls at least one of a rotation state of the first rotating bodies around the axis of the first shaft and a rotation state of the second rotating bodies around the second shaft;
   a support member that is fixed to the hub shaft and supports the first shaft and the second shaft, the support member extending in a radial direction of the hub shaft; and
   the hub shell rotatably supported with respect to the hub shaft around the axis of the hub shaft, the hub shell housing the first shaft, the second shaft, the plurality of first rotating bodies, the plurality of second rotating bodies, the clutch mechanism, and the support member, the hub shell including an inner gear that is provided on an internal circumferential surface of the hub shell and meshes with the output gear.

2. The internal transmission as recited in claim 1, wherein the plurality of first rotating bodies comprises gears, and the plurality of second rotating bodies comprises gears which mesh with the plurality of first rotating bodies.

3. The internal transmission as recited in claim 1, wherein at least one of the input gear and the output gear comprises a plurality of gears having different diameters.

4. The internal transmission as recited in claim 3, wherein at least the input gear comprises the plurality of gears having different diameters, and the plurality of second rotating bodies comprise a plurality of input side gears which mesh with each of the plurality of gears of the input gear.

5. The internal transmission as recited in claim 4, wherein the second shaft is formed by a hollow shaft which rotatably supports the plurality of second rotating bodies,
   the clutch mechanism comprises a control shaft and a plurality of engagement parts,
   the control shaft is disposed in the second shaft and is rotatable with respect to the second shaft, and
   the engagement parts are operated by a rotation of the control shaft and selectively transmits a rotation of one of the input side gears to the second shaft.

6. The internal transmission as recited in claim 5, wherein an opening is formed on an outer perimeter part of the second shaft,
   at least one engagement part of the plurality of engagement parts is disposed in the opening,
   the control shaft comprises a control portion for controlling the engagement part which is disposed in the opening, and switches between a first state in which the engagement part protrudes from the opening and a second state in which the engagement part retracts into the opening, by rotating with respect to the second shaft.

7. The internal transmission as recited in claim 6, wherein the clutch mechanism further comprises an elastic member for biasing the engagement part to protrude from the opening.

8. The internal transmission as recited in claim 5, wherein
the clutch mechanism comprises a speed increasing mechanism for increasing a speed of the rotation of the second shaft and providing the same to the control shaft, and a speed reducing mechanism for reducing the speed of the rotation of the second shaft and providing the same to the control shaft.

9. The internal transmission as recited in claim 3, wherein
at least the output gear comprises the plurality of gears having different diameters, and
the plurality of second rotating bodies comprise a plurality of output side gears which mesh with each of the plurality of gears of the output gear.

10. The internal transmission as recited in claim 9, wherein
the second shaft is formed by a hollow shaft which rotatably supports the second rotating bodies,
the clutch mechanism comprises a control shaft and a plurality of engagement parts,
the control shaft is disposed in the second shaft and is rotatable with respect to the second shaft, and
the engagement parts are operated by a rotation of the control shaft and selectively transmits a rotation of the second shaft to one of the output side gears.

11. The internal transmission as recited in claim 9, wherein
the second rotating bodies comprise a plurality of input side gears which mesh with each of the plurality of gears of the input gear,
the second shaft is formed by a hollow shaft which rotatably supports the second rotating bodies,
the clutch mechanism comprises a control shaft and a plurality of engagement parts,
the control shaft is disposed in the second shaft and is rotatable with respect to the second shaft, and
the engagement parts are operated by a rotation of the control shaft and selectively transmits a rotation of one of the input side gears to the second shaft and selectively transmits a rotation of the second shaft to one of the output side gears.

12. The internal transmission as recited in claim 1, wherein
the hub shaft comprises a first hub shaft and a second hub shaft which is separated from the first hub shaft in an axial direction of the hub shell,
the first hub shaft protrudes in one direction along the axial direction of the hub shell, and the second hub shaft protrudes in another direction opposite the one direction along the axial direction of the hub shell.

13. The internal transmission as recited in claim 12, wherein
the support member includes a first support member and a second support member, the first support member being fixed to the first hub shaft and the second support member being fixed to the second hub shaft, the first support member and the second support member being spaced apart from each other at an interval along the axial direction of the hub shell,
the first hub shaft extends away from the interval in the one direction, and
the second hub shaft extends away from the interval in the other direction.

14. The internal transmission as recited in claim 1, wherein
a distance between the hub shaft and the first shaft in a radial direction is substantially equal to a distance between the hub shaft and the second shaft in the radial direction.

15. The internal transmission as recited in claim 1, wherein
the axis of the first shaft and the axis of the second shaft are disposed symmetrically with respect to the axis of the hub shaft.

16. An internal transmission comprising:
a hub shaft configured to be attached to a frame of a bicycle;
a first shaft separated from an axis of the hub shaft and arranged to be non-rotatable around the axis of the hub shaft;
a second shaft separated from the axis of the hub shaft and from an axis of the first shaft, and the second shaft being non-rotatable around the axis of the hub shaft;
a plurality of first rotating bodies coaxially arranged with the first shaft and rotatably arranged around the axis of the first shaft, the plurality of first rotating bodies comprising an input gear to which a rotation is inputted and an output gear which outputs the rotation to a hub shell;
a plurality of second rotating bodies coaxially arranged with the second shaft, the second rotating bodies being coupled to each of the first rotating bodies, and the second rotating bodies being rotatably arranged around an axis of the second shaft;
a clutch mechanism which controls at least one of a rotation state of the first rotating bodies around the axis of the first shaft and a rotation state of the second rotating bodies around the second shaft;
a support member that is fixed to the hub shaft and supports the first shaft and the second shaft, the support member extending in a radial direction of the hub shaft;
the hub shell rotatably supported with respect to the hub shaft around the axis of the hub shaft, the hub shell housing the first shaft, the second shaft, the plurality of first rotating bodies, the plurality of second rotating bodies, the clutch mechanism, and the support member; and
a drive unit comprising a driver configured to be attached to a sprocket of the bicycle and an annular input part connected to the driver, the input part having an inner gear provided on an internal circumferential surface of the input part, the inner gear being configured to mesh with the input gear.

17. An internal transmission comprising:
a hub shaft configured to be attached to a frame of a bicycle;
a first shaft separated from an axis of the hub shaft and arranged to be non-rotatable around the axis of the hub shaft;
a second shaft separated from the axis of the hub shaft and from an axis of the first shaft, the second shaft being hollow and non-rotatable around the axis of the hub shaft;
a plurality of first rotating bodies coaxially arranged with the first shaft and rotatably arranged around the axis of the first shaft;
a plurality of second rotating bodies coaxially arranged with the second shaft, the second rotating bodies being coupled to each of the first rotating bodies, and the second rotating bodies being rotatably supported by the second shaft around an axis of the second shaft, the plurality of second rotating bodies comprising a plurality of input side gears;

a clutch mechanism which controls at least one of a rotation state of the first rotating bodies around the axis of the first shaft and a rotation state of the second rotating bodies around the second shaft, the clutch mechanism comprising a control shaft, a plurality of engagement parts, a speed increasing mechanism, and a speed reducing mechanism, the control shaft being disposed in the second shaft and rotatable with respect to the second shaft, the engagement parts being operated by a rotation of the control shaft to selectively transmit a rotation of one of the input side gears to the second shaft, the speed increasing mechanism being configured to increase a speed of the rotation of the second shaft and provide the same to the control shaft, and the speed reducing mechanism being configured to reduce the speed of the rotation of the second shaft and provide the same to the control shaft; and a hub shell rotatably arranged around the axis of the hub shaft and housing the first shaft, the second shaft, the plurality of first rotating bodies, the plurality of second rotating bodies, and the clutch mechanism, the plurality of first rotating bodies comprising an input gear to which a rotation is inputted and an output gear that outputs the rotation to the hub shell, at least one of the input gear and the output gear comprising a plurality of gears having different diameters, the plurality of input side gears meshing with each of the plurality of gears of the input gear, and the speed increasing mechanism comprising a first synchronizing gear configured to be integrally rotated with the second shaft, a second synchronizing gear configured to be integrally rotatable with the control shaft, a first auxiliary gear configured to mesh with one of the first synchronizing gear and the second synchronizing gear, a second auxiliary gear which configured to mesh with the other of the first synchronizing gear and the second synchronizing gear and configured to be integrally rotated with the first auxiliary gear, and a first switching unit configured to switch between a state in which the first auxiliary gear meshes with one of the first synchronizing gear and the second synchronizing gear, and a state in which the first auxiliary gear does not mesh with one of the first synchronizing gear and the second synchronizing gear.

18. The internal transmission as recited in claim 17, wherein the speed reducing mechanism comprises the first synchronizing gear, a third synchronizing gear configured to be integrally rotated with the control shaft and which has a fewer number of teeth than the second synchronizing gear, a third auxiliary gear configured to mesh with one of the first synchronizing gear and the third synchronizing gear, a fourth auxiliary gear configured to mesh with the other of the first synchronizing gear and the third synchronizing gear and configured to be integrally rotated with the second auxiliary gear, and a second switching unit configured to switch between a state in which the third auxiliary gear meshes with one of the first synchronizing gear and the third synchronizing gear, and a state in which the third auxiliary gear does not mesh with one of the first synchronizing gear and the third synchronizing gear.

* * * * *